(12) United States Patent
Nitta et al.

(10) Patent No.: US 6,625,207 B1
(45) Date of Patent: Sep. 23, 2003

(54) LOW POWER CONSUMPTION DATA TRANSMISSION CIRCUIT AND METHOD, AND LIQUID CRYSTAL DISPLAY APPARATUS USING THE SAME

(75) Inventors: Hiroyuki Nitta, Ebina (JP); Satoru Tsunekawa, Higashimurayama (JP); Hirobumi Koshi, Chiba-ken (JP); Atsuhiro Higa, Yokohama (JP)

(73) Assignees: Hitachi, Ltd., Tokyo (JP); Hitachi Video & Information System, Inc., Yokohama (JP)

(*) Notice: Subject to any disclaimer, the term of this patent is extended or adjusted under 35 U.S.C. 154(b) by 0 days.

(21) Appl. No.: 09/408,516

(22) Filed: Sep. 30, 1999

(30) Foreign Application Priority Data

Oct. 1, 1998 (JP) .......................................... 10-280262

(51) Int. Cl.[7] .............................. H04B 1/38; H04L 5/16
(52) U.S. Cl. ........................ 375/219; 375/295; 345/87; 345/100
(58) Field of Search ................................ 375/219, 295, 375/297, 257, 259, 240, 316; 345/87, 98, 100, 51, 1.2, 90, 88

(56) References Cited

U.S. PATENT DOCUMENTS 4,763,291 A * 8/1988 Schwaber .................. 345/169
5,410,512 A * 4/1995 Takase et al. .......... 365/230.03

OTHER PUBLICATIONS

Nikkei Electronics, published By Nikkei BP Inc., No. 556, Jun. 8, 1992, pp. 133–144.
Article 23.2 in SAID International Symposium Digest of Technical Paper, vol. XXV, 1994.

* cited by examiner

*Primary Examiner*—Chi Pham
*Assistant Examiner*—Demetria Williams
(74) *Attorney, Agent, or Firm*—Antonelli, Terry, Stout & Kraus, LLP

(57) ABSTRACT

In a low power consumption data transmission circuit and method, and a liquid crystal display apparatus using the same, 24-bit display data is transmitted from a transceiver circuit to a receiver circuit through a transmission line so that the display data is displayed on a liquid crystal panel. The transceiver circuit has a holding circuit including an 8-stage shift register. The transceiver circuit outputs 24-bit data to the transmission line by use of first and second output circuits when data different from data held in the holding circuit is to be transmitted from the transmission line and outputs data indicative of a hold position in the holding circuit from the second output circuit when the same data as that held in the holding circuit is to be transmitted from the transmission line. When the data indicative of a hold position is transmitted and received, the receiver circuit decodes or restores the received hold position indicating data into 24-bit display data by use of data held in a holding circuit provided in the receiver circuit.

19 Claims, 13 Drawing Sheets

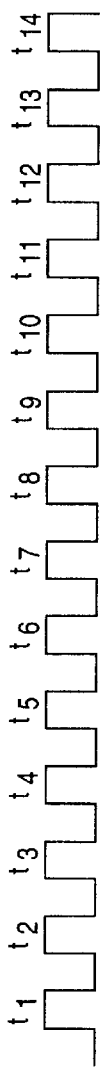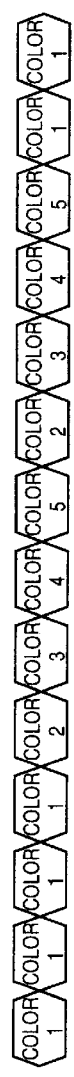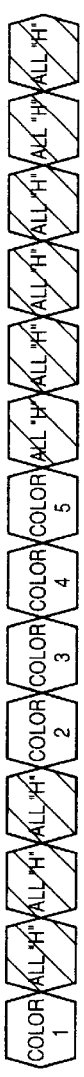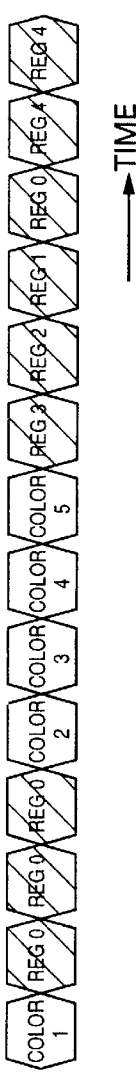
FIG.11A  TRANSMISSION CLOCK CLK
FIG.11B  INPUT DISPLAY DATA I-DATA
FIG.11C  REGISTER VALIDATION SIGNAL RE
FIG.11D  DATA (21BITS) (OUTPUT OF CKT160A)
FIG.11E  DATA (3BITS) (OUTPUT OF CKT160B)

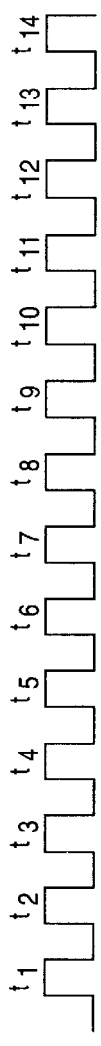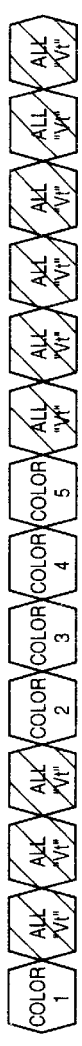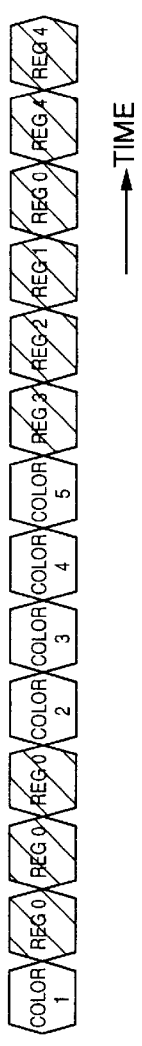

LOW POWER CONSUMPTION DATA TRANSMISSION CIRCUIT AND METHOD, AND LIQUID CRYSTAL DISPLAY APPARATUS USING THE SAME

BACKGROUND OF THE INVENTION

The present invention relates to a data transmission circuit and method in which data is transmitted and a liquid crystal display apparatus in which display data is transmitted and the transmitted data is displayed on a liquid crystal panel.

As the conventional data transmission circuit is known, for example, a data transmission circuit provided with an input/output interface called GTL (Gunning Transceiver Logic) or CTT (Center Tapped Termination), as disclosed by Nikkei Electronics, No. 556, Jun. 8, 1992, pp. 133 to 144 published by Nikkei BP-Sha.

In the conventional liquid crystal display apparatus, an inputted video signal is converted by a liquid crystal controller into a display data signal for input to a liquid crystal data driver. This display data signal is supplied to the liquid crystal data driver by use of a data transmission circuit as mentioned above. The liquid crystal data driver generates a liquid crystal driving voltage from the supplied display data signal and outputs the generated liquid crystal driving voltage to a liquid crystal panel, thereby effecting the display of an image. For example, in a liquid crystal display apparatus providing display with RGB×64 gradation levels (64 gradation levels for each of R, G and B) and 260 thousands of colors, display data generated by a liquid crystal controller is connected to a plurality of liquid crystal data drivers by a (RGB×6=18)-bit data bus so that the display data is transferred to each liquid crystal data driver to effect display, as disclosed by the article 23.2 in SID (SOCIETY FOR INFORMATION DISPLAY) INTERNATIONAL SYMPOSIUM DIGEST OF TECHNICAL PAPERS VOLUME XXV, 1994.

SUMMARY OF THE INVENTION

However, an apparatus such as a liquid crystal display apparatus using the conventional data transmission circuit has the problem of large power consumption. More particularly, as an output circuit of the data transfer circuit is used, for example, a CMOS circuit as an output circuit which transmits data represented by the voltage amplitude value of a power supply voltage, or an open drain circuit or push-pull circuit as a transmission bus in which a line is terminated. In the case where the CMOS circuit is used, a driving current flows when a bit value of output data (for example, display data) is changed. Thereby, an electric power is consumed. Thus, a possible method considered in order to reduce the power consumption is to cause the change in bit value of output data to be not made as much as possible. In the CMOS circuit, there is a fear that an operation following input data becomes insufficient as the speed of input data is higher.

On the other hand, in the open drain circuit or push-pull circuit as a transmission bus in which a line is terminated, a sufficient operation is enabled even for high-speed input data but a steady current flows irrespective of an input signal. Namely, in the case where the open drain circuit is used, a driving current does not flow unless output data has a high level. However, if the output data has a low level, a driving current flows. Thus, a possible method considered in order to reduce the power consumption is to cause the output data to be provided with a high level. Also, in the case where the push-pull circuit is used, a driving current flows with power consumption irrespective of whether the level of output data is high or low. Thus, a possible method considered in order to reduce the power consumption is to cause the output of a termination voltage level.

In recent years, the image resolving power of a liquid crystal panel has been improved with the larger size of the liquid crystal panel. Therewith, the amount of display data to be transmitted to the liquid crystal panel within a unit time is increased. Accordingly, there is the problem that the power consumption of the transmission circuit is increased more and more.

Accordingly, an object of the present invention is to provide a data transmission circuit and method in which a reduction in power consumption is enabled and a liquid crystal display apparatus which uses such data transmission circuit or method.

To attain the above object, a data transmission circuit according to one aspect of the present invention has a transmitter section sequentially inputted with n-bit parallel data (n: an integer) and a receiver section connected to the transmitter section through a transmission line, in which the n-bit parallel data is transmitted from the transmitter section to the receiver section through the transmission line. The transmitter section is provided with a first holding circuit for storing, the n-bit parallel data inputted to the transmitter section, by plural sets the number of which is not more than $2^m$ (m: an integer satisfying m<n), judgement means for judging whether or not the present n-bit parallel data inputted to the transmitter section is identical to any one of the plural sets of n-bit parallel data stored in the first holding circuit, thereby outputting a first result of judgement in the case where the identification to any one of the plural sets is determined and a second result of judgement in the case where the identification to none of the plural sets is determined, hold position information output means for outputting information with m or less bits indicative of a hold position of the one set of n-bit parallel data in a second holding circuit in the case where the first result of judgement is outputted by the judgement means, and first output means for transmitting the hold position information to the receiver section through the transmission line in the case where the first result of judgement is outputted by the judgement means while transmitting, the present n-bit parallel data inputted to the transmitter section, to the receiver section through the transmission line in the case where the second result of judgement is outputted by the judgement means. In the case where the second result of judgement is outputted by the judgement means, the first holding circuit is inputted and stored with the present n-bit parallel data inputted to the transmitter section. The receiver section is provided with the second holding circuit for storing the same plural sets of n-bit parallel data as the first holding circuit, and second output means for reading, in the case where the hold position information is received through the transmission line, the one set of n-bit parallel data from the second holding circuit in accordance with the hold position information and outputting the read data from the receiver section while storing, in the case where the present n-bit parallel data is received through the transmission line, the received present n-bit parallel data into the second holding circuit and outputting the data from the receiver section.

Thus, in the present invention, in the case where the present n-bit parallel data inputted to the transmitter section is identical to any one of the plural sets of n-bit parallel data stored in the first holding circuit, information with m or less bits indicative of a hold position of the one set of n-bit parallel data in the second holding circuit is transmitted. Therefore, it is possible to make a reduction in power consumption as compared with the case where one set of n-bit parallel data is transmitted.

In an example of the present invention, each of the first and second output circuits is a circuit (for example, a CMOS circuit) for transmitting the n-bit parallel data in which data is represented by the voltage amplitude value of a power supply voltage and the first output circuit has a data holding circuit (for example, a latch circuit. In the case where the second result of judgement is outputted by the judgement means, (n–m)-bit parallel data in the present n-bit parallel data inputted to the transmitter section is transmitted from the first output circuit to the receiver section through the transmission line while the present (n–m)-bit parallel data is stored into the data holding circuit. In the case where the first result of judgement is outputted by the judgement means, that (n–m)-bit parallel data immediately before the output of the first result of judgement which is stored in the data holding circuit, is transmitted from the first output circuit to the receiver section through the transmission line.

With such a construction, in the case where the first result of judgement is outputted, the bit value of output data is not changed and hence a driving current does not flow, thereby making it possible to reduce the power consumption as compared with the prior art.

In an example of the present invention, the transmission line is connected to a termination voltage through a terminating resistor. In the case where the second result of judgement is outputted by the judgement means, the first and second output circuits transmit an output with a low level and an output with a high level to the receiver section through the transmission line in accordance with (n–m)-bit parallel data of the present n-bit parallel data inputted to the transmitter section 100. In the case where the first result of judgement is outputted by the judgement means, the first and second output circuits transmit an output with a termination voltage level or an output with a high level to the receiver section through the transmission line.

In an example of the present invention, the first and second output circuits are open drain circuits, the above-mentioned output with a low level is a voltage level between a ground voltage and the termination voltage level, and the above-mentioned output with a high level is the termination voltage level. In the case where the first result of judgement is outputted by the judgement means, the output with a high level is transmitted to the receiver section through the transmission line. With such a construction, in the case where the first result of judgement is outputted, a steady current does not flow. Thereby, it is possible to reduce the power consumption as compared with the prior art.

In another example of the present invention, the first and second output circuits are push-pull circuits, the above-mentioned output with a low level is a voltage level between the ground voltage and the termination voltage level, and the above-mentioned output with a high level is a level between a power supply voltage of the first output section and the termination voltage level. In the case where the first result of judgement is outputted by the judgement means, the output with the termination voltage level is transmitted to the receiver section through the transmission line. With such a construction, in the case where the first result of judgement is outputted, a steady current does not flow. Thereby, it is possible to reduce the power consumption as compared with the prior art.

BRIEF DESCRIPTION OF THE DRAWINGS

FIGS. 11A to 11E are charts for explaining the operation of a holding circuit used in a transceiver circuit of the data transmission circuit of the liquid crystal apparatus according to the second embodiment of the present invention;

FIGS. 15A to 15E are charts for explaining the operation of a holding circuit used in a transceiver circuit of the data transmission circuit of the liquid crystal apparatus according to the third embodiment of the present invention.

DETAILED DESCRIPTION OF THE EMBODIMENTS

Figure 1:
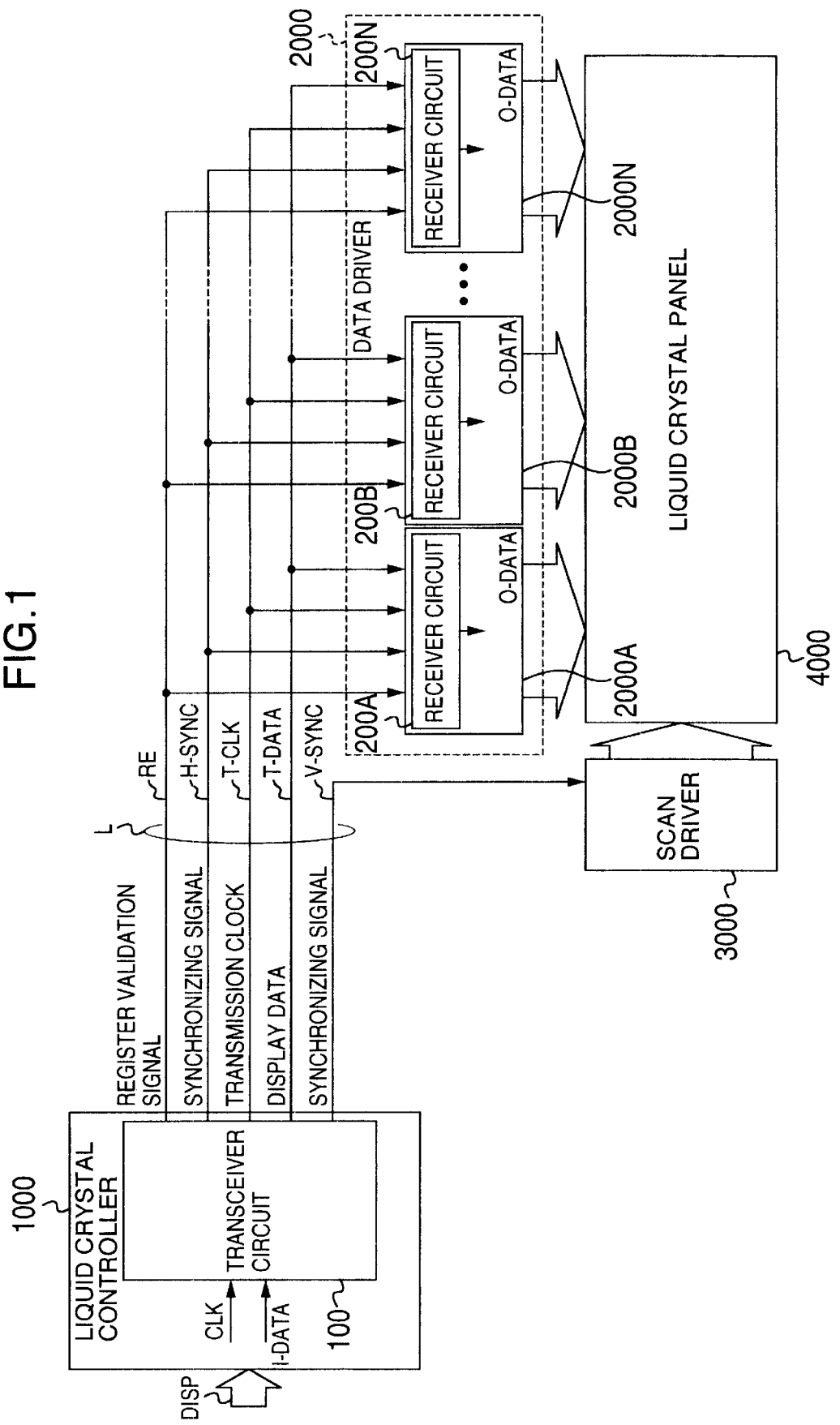
FIG. 1 is a block diagram showing the overall construction of a liquid crystal display apparatus according to an embodiment of the present invention.

Data transmission circuits according to embodiments of the present invention will now be described in reference to the accompanying drawings.

First, the description using FIGS. 1 to 8 will be made in conjunction with an example of the construction of a liquid crystal display apparatus to which a data transmission circuit according to an embodiment of the present invention is applied. The data transmission circuit according to the present invention is applicable to another apparatus.

A data transmission circuit according to one aspect of the present invention has the following construction.

Namely, the data transmission circuit has a transmitter section (for example, a transceiver circuit 100) sequentially inputted with n-bit parallel data (n: an integer, for example, 24) and a receiver section (for example, receiver circuits 200) connected to the transmitter section through a transmission line. The n-bit parallel data is transmitted from the transmitter section to the receiver section through the transmission line. The transmitter section is provided with a first holding circuit (110) for storing, n-bit parallel data inputted to the transmitter section, by plural sets (for example, 8 kinds) the number of which is not more than $2^m$ (m: an integer satisfying m<n), a judgement unit (for example, comparators CP0 to CP7, an OR circuit 130, a latch circuit 145 and RE) for judging whether or not the present n-bit parallel data inputted to the transmitter section is identical to any one of the plural sets of n-bit parallel data stored in the first holding circuit and outputting a first result of judgement (RE) in the case where the identification is determined and a second result of judgement (RE) in the case where the non-identification is determined, a hold position information output unit (for example, an encoder 120 and a latch circuit 140) for outputting information with m or less bits indicative of a hold position of the one set of n-bit parallel data in a second holding circuit (210) in the case where the first result of judgement is outputted by the judgement unit, and a first output unit (for example, a selection circuit 150 and output circuits 160A and 160B) for transmitting the hold position information to the receiver section through the transmission line in the case where the first result of judgement is outputted by the judgement unit while transmitting, the present n-bit parallel data inputted to the transmitter section, to the receiver section through the transmission line in the case where the second result of judgement is outputted by the judgement unit. In the case where the second result of judgement is outputted by the judgement unit, the first holding circuit is inputted and stored with the present n-bit parallel data inputted to the transmitter section. The receiver section is provided with the second holding circuit (210) for storing the same plural sets of n-bit parallel data as the first holding circuit, and a second output unit (for example, input circuits 220A to 220C, latch circuits 230 and 235, and a selection circuit 240) for reading, in the case where the hold position information is received through the transmission line, the one set of n-bit parallel data from the second holding circuit in accordance with the hold position information and outputting the read data from the receiver section while storing, in the case where the present n-bit parallel data is received through the transmission line, the received present n-bit parallel data into the second holding circuit and outputting the data from the receiver section.

First, an example of the overall construction of the liquid crystal display apparatus in the present embodiment will be described using FIG. 1. In each embodiment described in the following, an example of n-bit parallel data (n: an integer) inputted to a transmitter section (for example, a transceiver circuit 100) is display data of 24 bits with 8 bits for each of R, G and B (for example, display with 256 gradation levels and 16,777,216 colors). However, the present invention is applicable irrespective of the number of bits or is also applicable to the case of parallel data the number of bits of which is other than 24. In the present invention, such n-bit parallel data is transmitted, as one set of display data, that is, display data for one pixel, to the receiver circuit serially or sequentially every one pixel.

The liquid crystal display apparatus according to the present embodiment is composed of a liquid crystal controller 1000, a data driver 2000, a scan driver 3000 and a liquid crystal panel 4000. The liquid crystal controller 1000, the data driver 2000 and the scan driver 3000 are connected by a transmission line L.

The liquid crystal controller 1000 is inputted with a display signal DISP transferred from a system device. On the basis of the inputted display signal DISP, the liquid crystal controller 1000 generates display data DATA to be displayed on the liquid crystal panel 4000. A transceiver circuit 100 generates transmit display data T-DATA, a display data transmission clock T-CLK, a horizontal synchronizing signal H-SYNC, a vertical synchronizing signal V-SYNC and a register validation signal RE on the basis of inputted display data I-DATA and outputs them to the data driver 2000 and the scan driver 3000. The details of the transceiver circuit 100 will be described later on by use of FIG. 2. The transmit display data T-DATA is transmitted on a data bus which is a 24-bit parallel bus. The horizontal synchronizing signal H-SYNC is a synchronizing signal indicating the timing of the data driver 2000 which will be described later on. The vertical synchronizing signal V-SYNC is a synchronizing signal indicating the timing of the scan driver 3000 which will be described later on. The register validation signal RE is newly provided in the present embodiment and the details thereof will be described later on by use of FIG. 2.

The data driver 2000 sequentially takes in the transmit display data T-DATA every one pixel on the basis of the transmission clock T-CLK, the horizontal synchronizing signal H-SYNC and the register validation signal RE transmitted from the transceiver circuit 100 of the liquid crystal controller 1000 to generate a liquid crystal driving voltage corresponding to the display data. The data driver 2000 is generally composed of a plurality of data drivers 2000A, 2000B, - - - , and 2000N which are provided corresponding to the resolving power of the liquid crystal panel 4000. The respective data drivers 2000A, 2000B, - - - , and 2000N are provided with receiver circuits 200A, 200B, - - - , and 200N which sequentially take in the transmit display data T-DATA every one pixel on the basis of the transmission clock T-CLK, the horizontal synchronizing signal H-SYNC and the register validation signal RE to generate output display data O-DATA. The detailed construction of the receiver circuit (200A, 200B, - - - , 200N) will be described later on by use of FIG. 5.

The scan driver 3000 generates a sequential selection signal for the liquid crystal panel 4000 on the basis of the inputted vertical synchronizing signal V-SYNC.

A data transmission circuit is formed by the transceiver circuit 100, the receiver circuits 200 and the transmission line L which connects both the circuits. Display data of RGB×8 bits or 24 bits in total is transmitted from the transceiver circuit 100 to the receiver circuits 200A, 200B, - - - , and 200N, serially every one pixel, through the data bus in the transmission line L.

Next, an example of the construction of the transceiver circuit 100 used in the data transmission circuit of the liquid crystal display apparatus according to the present embodiment will be described using FIG. 2.

The transceiver circuit 100 is composed of a holding circuit 110, $2^m$ (for example, m=3) or less (for example, eight) comparators CP0, CP2, - - - and CP7, an encoder 120, an OR circuit 130, latch circuits 140 and 145, a selection circuit 150, and output circuits 160A, 160B, 160C and 160D.

The holding circuit 110 is sequentially inputted with the data transmission clock CLK and the input display data I-DATA which is parallel data having, for example, 24 bits with 8 bits for each of R,G and B. The holding circuit 110 sequentially holds plural sets of received input display data I-DATA in synchronism with the timing of the transmission clock CLK. Herein, the holding circuit 110 is constructed such that it holds eight sets of input display data I-DATA and the held input display data I-DATA turns into eight different kinds of data through an operation which will be described later on. The holding circuit 110 outputs the plural sets of held display data as data RD0, RD1, - - - and RD7. An example of the detailed construction of the holding circuit 110 will be described later on by use of FIG. 3.

Respective first input terminals of the comparators CP0, CP1, - - - and CP7 are inputted with the data RD0, RD1, - - - and RD7 outputted by the holding circuit 110 and the other or second input terminals thereof are inputted with the input display data I-DATA. The comparator CP0, CP1, - - - or CP7 compares the data RD0, RD1, - - - or RD7 and the input display data I-DATA to output a coincidence signal AG0, AG1, - - - or AG7 which takes one level (for example, high level) when both the data coincide with each other (that is, a signal indicative of a first result of judgement).

The coincidence signals AG0, AG1, - - - and AG7 are inputted to the encoder 120 and the OR circuit 130. The encoder 120 encodes the coincidence signals AG0, AG1, - - - and AG7 of 8 bits into a 3-bit signal. For example, when the coincidence signal AG0 takes a high level, an output signal of the encoder 120 (that is, hold position information) provides a 3-bit signal of "000". When the coincidence signal AG1 takes a high level, the output signal of the encoder 120 provides a 3-bit signal of "001". When the coincidence signal AG2 takes a high level, the output signal of the encoder 120 provides a 3-bit signal of "010". The encoded 3-bit signal is latched by the 3-bit latch circuit 140.

The OR circuit 130 produces a logical sum of the coincidence signals AG0, AG1, - - - and AG7 to output a selection signal SEL which takes a high level when any one of the coincidence signals AG0, AG1, - - - and AG7 takes a high level. The selection signal SEL is inputted to the holding circuit 110 and the latch circuit 145. The selection signal SEL latched by the latch circuit 145 is inputted as a register validation signal RE to the output circuit 160A, the selection circuit 150 and the output circuit 160C.

In the present embodiment, present 24-bit input display data I-DATA inputted to the transceiver circuit 100 is divided into, for example, display data of 21 upper bits and display data of 3 lower bits. Another possible method of bit division may include the division into 21 lower bits and 3 upper bits or the extraction of any 3 bits from the 24-bit data.

In the case where the register coincidence signal RE takes, for example, a low level, that is, in the case where present input display data I-DATA inputted to the holding circuit 110 coincides with none of 8 kinds of display data (or in the case where a second result of judgement is obtained), the output circuit 160A outputs the inputted 21-bit display data as it is. Also, the selection circuit 150 responds to the signal RE to select the 3-bit display data so that it is provided to the output circuit 160B. Namely, the 24-bit input display data I-DATA is outputted as 21-bit transmit display data T-DATA (21) from the output circuit 160A and as 3-bit transmit display data T-DATA(3) from the output circuit 160B.

On the other hand, in the case where the register coincidence signal RE takes a high level, that is, in the case where present input display data I-DATA inputted to the holding circuit 110 coincides with any one of 8 kinds of display data (or in the case where the first result of judgement is obtained), the output circuit 160A continues the output of 21-bit display data inputted preceding the present 21-bit display data. Also, the selection circuit 150 selects the output data of the encoder 120 latched by the latch circuit 140 (or hold position information) so that it is provided to the output circuit 160B. Namely, only 3-bit encoded data is outputted as T-DATA(3) from the output circuit 160B.

Also, the register validation signal RE is outputted from the output circuit 160C and the transmission clock CLK is outputted from the output circuit 160D.

Figure 2:
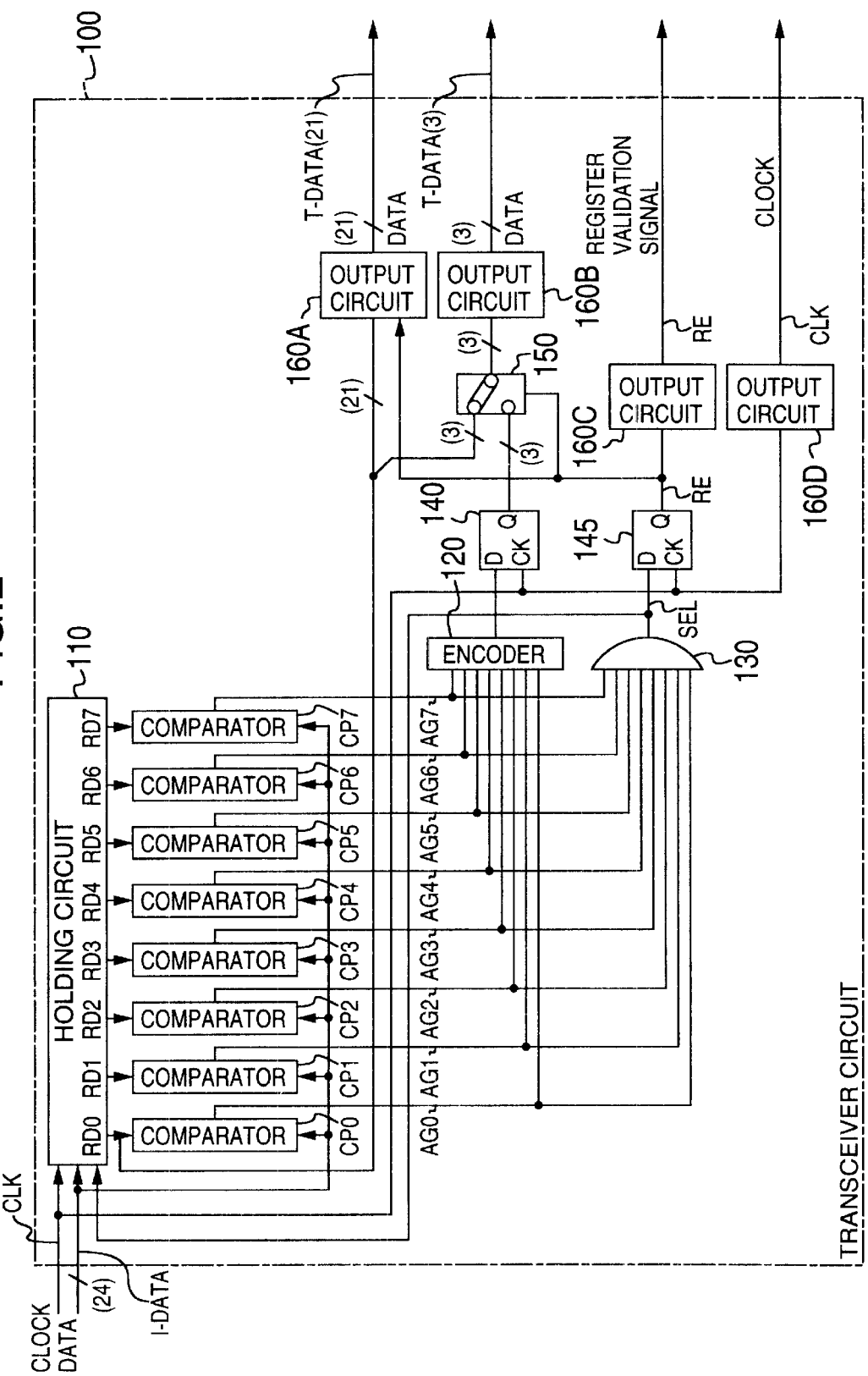
FIG. 2 is a circuit diagram showing the construction of a transceiver circuit used in a data transmission circuit of the liquid crystal apparatus according to the embodiment of the present invention.

In FIG. 2, symbols (24), (21) and (3) applied to the transmission lines indicate 24-bit, 21-bit and 3-bit parallel data, respectively. Such denotation is similarly made in FIG. 3 and subsequent figures.

Now, an example of the construction of the holding circuit 110 used in the transceiver circuit 100 of the data transmission circuit of the liquid crystal display apparatus according to the present embodiment will be described using FIG. 3.

The holding circuit 110 in the present embodiment is composed of a plurality of (for example, eight) 24-bit registers SR0, SR1, - - - and SR7, and eight selection circuits SL0, SL1, - - - and SR7. The registers SR0, SR1, - - - and SR7 are connected in a 8-stage configuration to form a shift register.

The selection circuit SL0 selects one of the input display data I-DATA and an output Q of the register SR0 in accordance with the selection signal SEL to input the selected data to an input terminal D of the register SR0. In the case where the selection signal SEL takes a low level, the selection circuit SL0 selects the input display data I-DATA so that the data is held by the register SR0. In the case where the selection signal SEL takes a high level, the selection circuit SL0 selects data held in the register SR0 so that the data is held again by the register SR0. The data held by the register SR0 is outputted as data RD0.

The selection circuit SL1 selects one of the output Q of the register SR0 and an output Q of the register SR1 in accordance with the selection signal SEL to input the selected data to an input terminal D of the register SR1. In the case where the selection signal SEL takes a low level, the selection circuit SL0 selects the output Q of the register SR0 so that the data is held by the register SR1. In the case where the selection signal SEL takes a high level, the selection circuit SL0 selects data held in the register SR1 so that the data is held again by the register SR1. The operations of the selection circuits SL2 to SL7 are similar to that of the selection circuit SL1.

Now, the operation of the holding circuit 110 for specific input display data I-DATA will be described using FIGS. 4A to 4J together with FIG. 2 and FIG. 3.

FIG. 4A shows transmission clock CLK, and FIG. 4B shows input display data I-DATA inputted in synchronism with the transmission clock CLK. Namely, in synchronism with the timings t1, t2, t3, t4, t5, - - - of the transmission clock CLK, "Color 1", "Color 1", "Color 1", "Color 1", "Color 2", - - - are sequentially inputted as the input display data I-DATA to the holding circuit 110 of FIGS. 2 and 3.

At time t1, "Color 1" is held by the register SR0, as shown by FIG. 4D, and data RD0 shown in FIG. 2 provides "Color 1".

Next, when "Color 1" in the input display data is inputted to the holding circuit 110 at time t2, the comparator CP0 shown in FIG. 2 outputs a coincidence signal AG0 with a high level since the data RD0 and the input display data I-DATA coincide with each other. Accordingly, a selection signal SEL outputted by the OR circuit 130 takes a high level so that the selection circuits SL0 to SL7 shown in FIG. 3 select the outputs Q of the registers SR0 to SR7, respectively. As a result, the held contents of the register SR0 are maintained, as shown at time t2 in FIG. 4D. Also, when the selection signal SEL takes the high level, a register validation signal RE turns into a high level, as shown in FIG. 4C. Accordingly, the selection circuit 150 selects the output of the latch circuit 140. Herein, the output of the encoder 120 takes "000". Therefore, the output circuit 160B outputs "000". Since this encoded data indicates the register SR0, there results in that data indicating "Reg 0" is outputted from the output circuit 160B, as shown in FIG. 4J. Also, when the register validation signal RE takes the high level, the output circuit 160A maintains the preceding output. Therefore, the output circuit 160A outputs the same "Color 1" as that at time t1, as shown in FIG. 4I. The operations at times t3 and t4 are similar to that at time t2.

When "Color 2" is inputted as the input display data I-DATA to the holding circuit 110 at time t5, the output of the comparator CP0 shown in FIG. 2 turns into a low level. Therefore, the selection signal SEL outputted by the OR circuit 130 turns into a low level. Accordingly, the selection circuit SL0 shown in FIG. 3 selects the input data I-DATA and the selection circuit SL1 selects the output of the register SR0. As a result, the register SR0 holds "Color 2", as shown in FIG. 4D and the register SR1 holds "Color 1" shifted from the register SR0, as shown in FIG. 4E.

At times t6 to t8, the input display data I-DATA sequentially changes to "Color 3", "Color 4" and "Color 5", as shown in FIG. 4B. Therefore, the registers SR0, SR1, SR2, SR3 and SR4 sequentially operate as a shift register in a manner similar to that in the operation described in conjunction with time t5 so that they hold "Color 5", "Color 4", "Color 3", "Color 2" and "Color 1", respectively, at time t8.

Next, when "Color 2" in the input display data is inputted to the holding circuit 110 at time t9, "Color 2" is held in the register SR3 at time t9, as shown in FIG. 4G. Therefore, the comparator CP3 shown in FIG. 2 outputs a coincidence signal AG3 with a high level since both the data RD3 and the input display data I-DATA coincide as "Color 2". Accordingly, the selection signal SEL outputted by the OR circuit 130 turns into a high level so that the selection circuits SL0 to SL7 shown in FIG. 3 select the outputs Q of the registers SR0 to SR7, respectively. As a result, the held contents of the registers SR0 to SR4 at time t8 are maintained, as shown at time t9 in FIGS. 4D to 4H. Also, when the selection signal SEL takes the high level, the register validation signal RE turns into a high level, as shown in FIG. 4C. Accordingly, the selection circuit 150 selects the output of the latch circuit 140. Herein, the output of the encoder 120 takes "011". Therefore, the output circuit 160B outputs "011". Since this encoded data indicates the register SR3, there results in that data indicating "Reg 3" is outputted from the output circuit 160B, as shown in FIG. 4J. Also, when the register validation signal RE takes the high level, the output circuit 160A maintains the preceding output. Therefore, the output circuit 160A outputs the same "Color 5" as that at time t8, as shown in FIG. 4I. Up to time t14, the same input display data I-DATA as that having already been held in the holding circuit 110 is inputted as "Color 3" at time t10, "Color 4" at time t11, - - - . Therefore, the operations at times t10 to t14 are similar to that at time t9. However, since the position of a register having the held data is different, 3-bit data indicating each register position is outputted, as shown in FIG. 4J.

Namely, as shown in FIGS. 4I and 4J, in the case where the input display data I-DATA is the same as data held in the holding circuit 110 (as shown at times t2, t3, t4, t9, t10, t11, t12, t13 and t14 in FIGS. 4A to 4J), the 21-bit data shown in FIG. 4J holds the preceding data and the display data can be transmitted using the 3-bit data. Namely, the transmission of 24-bit display data is performed with 3 bits.

Figure 5:
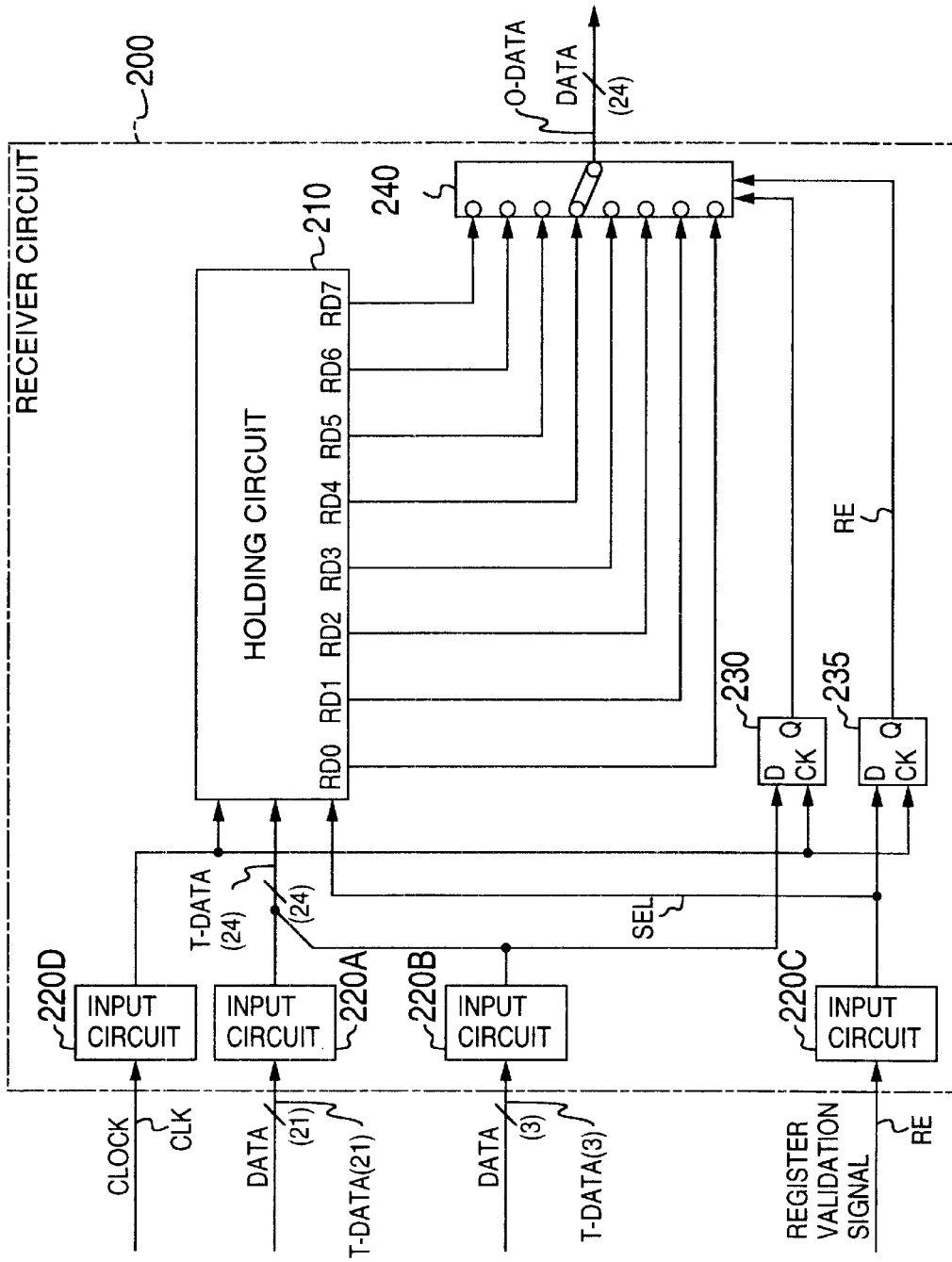
FIG. 5 is a circuit diagram showing the construction of a receiver circuit used in the data transmission circuit of the liquid crystal apparatus according to the embodiment of the present invention.

Next, an example of the construction of the receiver circuit 200 used in the data transmission circuit of the liquid crystal display apparatus according to the present embodiment will be described using FIG. 5.

The receiver circuit 200 is composed of a holding circuit 210, input circuits 220A, 220B, 220C and 220D, latch circuits 230 and 235, and a selection circuit 240.

The input circuit 220A is inputted with 21-bit transmit display data T-DATA(21) outputted by the output circuit 160A shown in FIG. 2. The input circuit 220B is inputted with 3-bit transmit display data T-DATA(3) outputted by the output circuit 160B shown in FIG. 2. The transmit display data T-DATA(21) and the transmit display data T-DATA(3) are inputted as 24-display data T-DATA(24) to the holding circuit 210. Also, the transmit display data T-DATA(3) is held by the latch circuit 230.

The input circuit 220C is inputted with a register validation signal RE outputted by the output circuit 160C shown in FIG. 2. The register validation signal RE is held by the latch circuit 235 while it is inputted as a selection signal SEL to the holding circuit 210. The input circuit 220D is inputted with a clock CLK outputted by the output circuit 160D shown in FIG. 2. The clock CLK is inputted as a synchronizing signal to the holding circuit 210 and the latch circuits 230 and 235.

The holding circuit 210 is inputted with the data transmission clock CLK, the parallel transmit display data T-DATA of RGB×8 bits or 24 bits in total, and the selection signal SEL. The holding circuit 210 is constructed so that it sequentially holds, plural sets of input display data I-DATA inputted thereto, in synchronism with the timing of the transmission clock CLK. Herein, the holding circuit 210 is constructed such that it holds $2^m$ (for example, m=3) or less (for example, eight) sets of input display data (or n-bit parallel data) I-DATA and the held input display data I-DATA turns into eight different kinds of data through an operation which will be described later on. The holding circuit 210 outputs the plural sets of held display data as data RD0, RD1, - - - and RD7.

Figure 3:
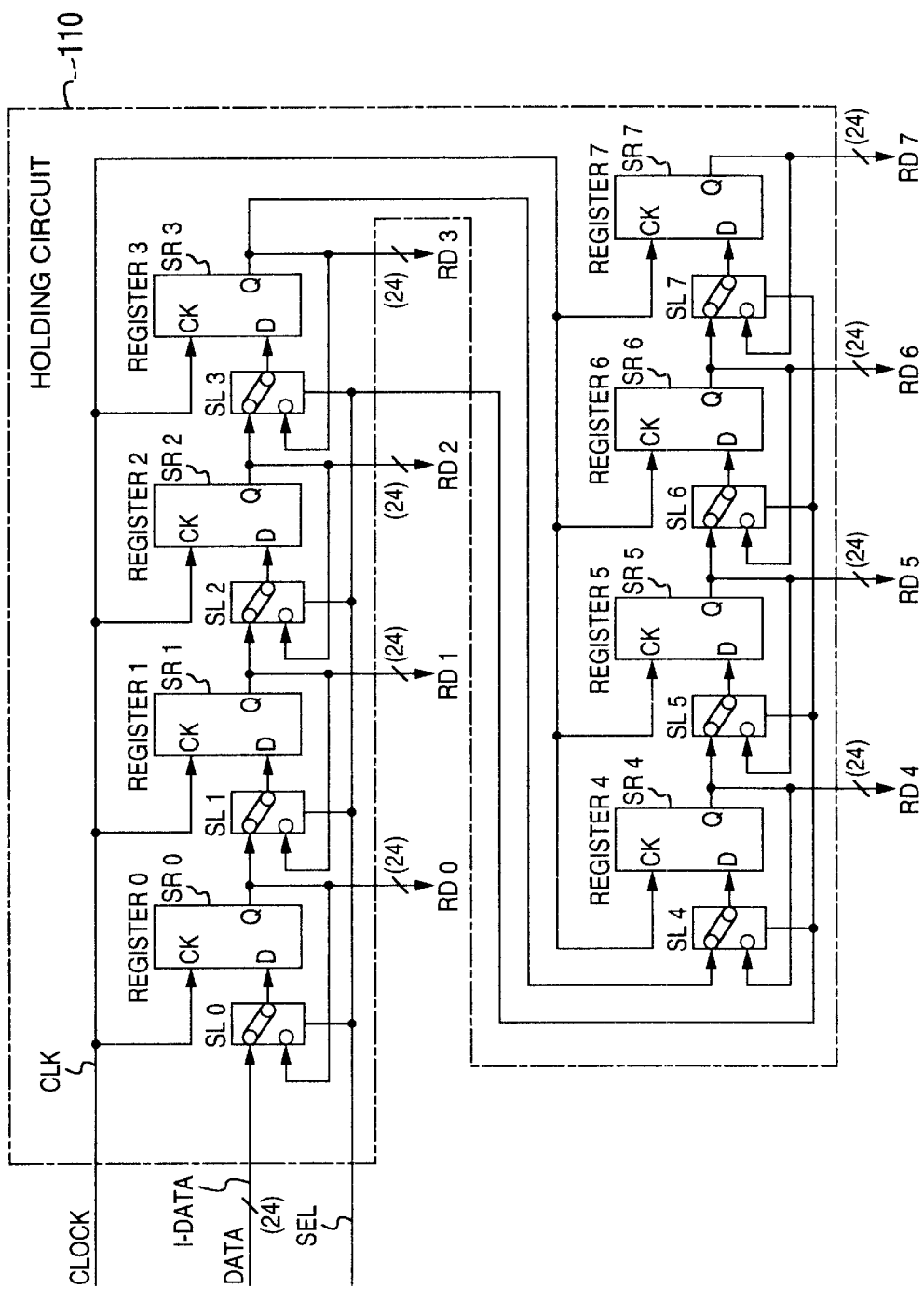
FIG. 3 is a circuit diagram showing the construction of a holding circuit used in the transceiver circuit of the data transmission circuit of the liquid crystal apparatus according to the embodiment of the present invention.
Figure 4:
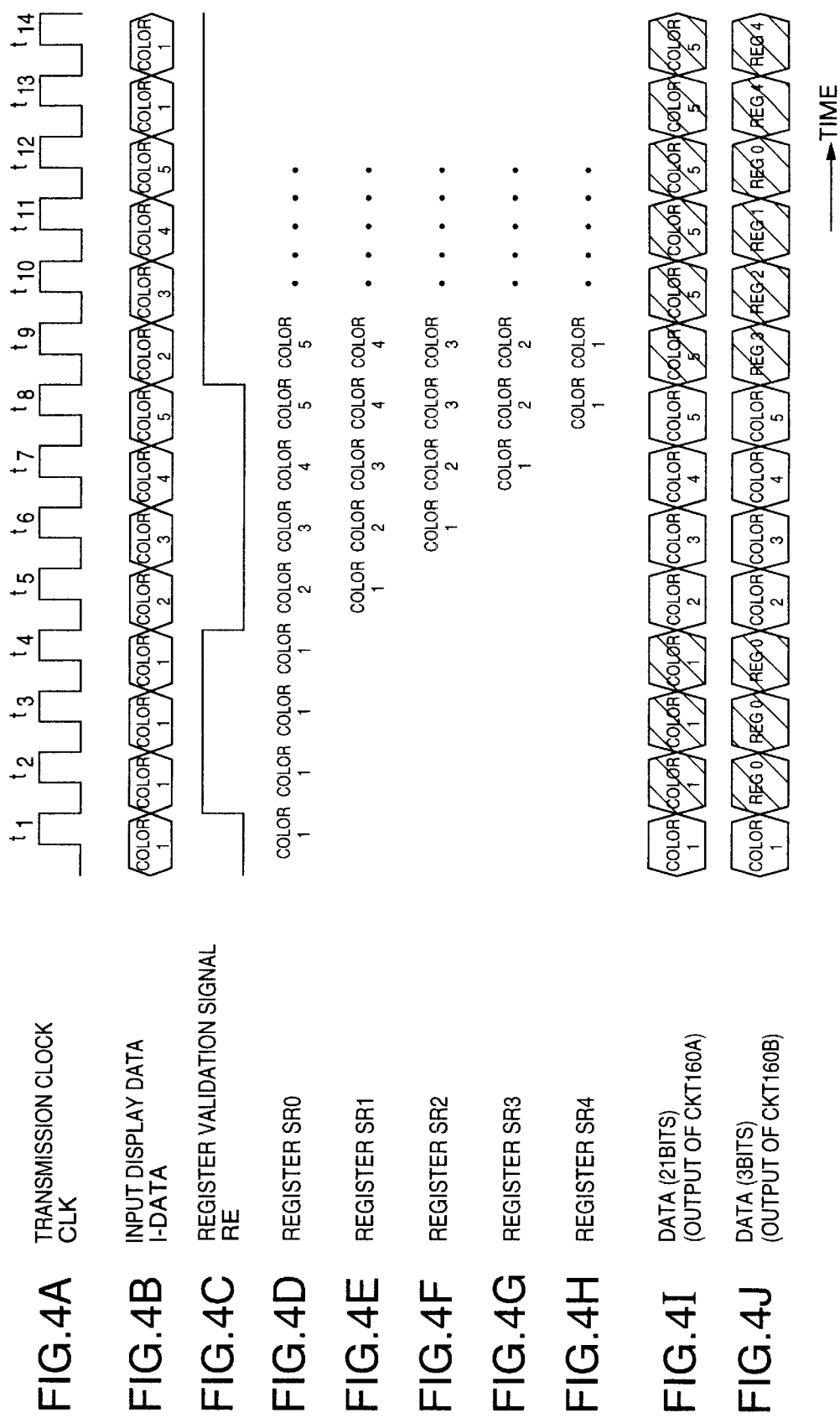
FIGS. 4A to 4J are charts for explaining the operation of the holding circuit used in the transceiver circuit of the data transmission circuit of the liquid crystal apparatus according to the embodiment of the present invention.

The construction of the holding circuit 210 is similar to that of the holding circuit 110 shown in FIG. 3. Therefore, when the selection signal SEL has a low level, the holding circuit 210 operates as a 8-stage shift register which holds the inputted transmit display data T-DATA while sequentially shifting it. When the selection signal SEL turns into a high level, a value held at the preceding timing is held as it is. The holding circuit 110 and the holding circuit 120 are synchronized by the transmission clock CLK. Therefore, when data held by the 8 stages of registers SR0 to SR7 forming the holding circuit 110 changes as shown in FIGS. 4D to 4H, the contents of the 8 stages of registers forming the holding circuit 210 have a similar change.

In the case where the register validation signal RE has a low level, the selection circuit 240 selects the output RD0 of the holding circuit 210 and outputs it as output display data O-DATA. Since this output RD0 corresponds to the output RD0 shown in FIG. 3, it is data held by the register SR0. Accordingly, when the data of register SR0 of the holding circuit 110 has a sequential change to "Color 2", "Color 3", "Color 4" and "Color 5", as shown at times t5 to t8 in FIG. 4D, the output RD0 of the holding circuit 210 has a similar sequential change to "Color 2", "Color 3", "Color 4" and "Color 5".

On the other hand, in the case where the register validation signal RE has a high level, the selection circuit 240 selects data RD0, - - - or RD7 indicated by a decoded value of 3-bit data held by the latch circuit 230 and outputs the selected data as output display data O-DATA. Since the output RD0, - - - or RD7 of the holding circuit 210 corresponds to the output RD0, - - - or RD7 shown in FIG. 3, it is data held by the register SR0, - - - or SR7. Accordingly, in the case where the 3-bit data held by the latch circuit 230 is "Reg 3", as shown at time t9 in FIG. 4J, a value held by the register SR3 shown in FIG. 3, that is, the output data RD3 of the holding circuit 210 is selected so that "Color 2" is outputted.

As mentioned in the foregoing, in the case where input display data I-DATA is the same as data held in the holding circuit 110 (as shown at times t2, t3, t4, t9, t10, t11, t12, t13 and t14 in FIGS. 4A to 4J), 21-bit data shown in FIG. 4I holds the preceding data and the display data can be transmitted using 3-bit data. Namely, the transmission of 24-bit display data can be performed with 3 bits. On the other hand, the receiver circuit 200 can use data held by the holding circuit 210 to restore the transmitted 3-bit data into 24-bit data.

Next, the construction and operation of the output circuit 160A and the input circuit 220A used in the data transmission circuit of the liquid crystal apparatus according to the present embodiment will be described using FIGS. 6 and 7.

The output circuit 160A is composed of switching circuits SW1 and SW2 of CMOS, a selection circuit 162 and a latch circuit 164. The switching circuits SW1 and SW2 are connected in series between a power supply voltage VCC and a ground potential GND, and the gate of the switching circuit SW1 has an inverted input.

Input data I-DATA is inputted to the selection circuit 162 and the latch circuit 164. The latch circuit 164 holds the input data I-DATA and outputs it to the selection circuit 162. The selection circuit 162 selects one of inputs in accordance with a register validation signal RE. When the register validation signal RE has a low level, the selection circuit 162 outputs the input data I-DATA to the switching circuits SW1 and SW2 as it is. When the register validation signal RE has a high level, the selection circuit 162 outputs, the input data I-DATA held by the latch circuit 164, to the switching circuits SW1 and SW2. With such a construction, the selection circuit 164 operates so that for example, as shown at time t2, t3 or t4 in FIG. 4I, the preceding display data "Color 1" is outputted as maintained.

Figure 7:
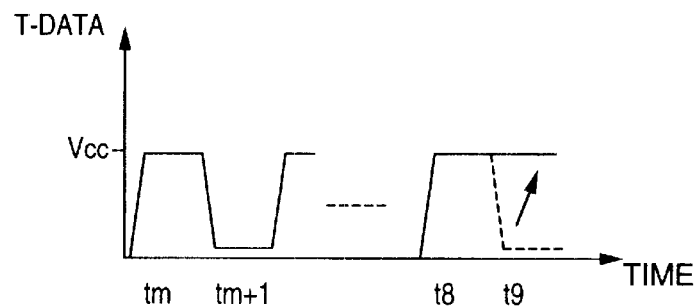
FIG. 7 is a diagram for explaining the operation of an output circuit and an input circuit used in the data transmission circuit of the liquid crystal apparatus according to the embodiment of the present invention.

When the input data I-DATA has a low level, the switching circuit SW1 is turned on and the switching circuit SW2 is turned off, so that transmit data T-DATA outputted from the output circuit 160A to the transmission line L takes a high level of the power supply voltage VCC at time tm, as shown in FIG. 7. Also, when the input data I-DATA has a high level, the switching circuit SW1 is turned off and the switching circuit SW2 is turned on, so that the transmit data T-DATA outputted from the output circuit 160A takes a low level of the ground potential GND at time tm+1, as shown in FIG. 7.

In the present embodiment, in the case where data held in the holding circuit 110 is transmitted, as shown at times 8 and 9 in FIG. 4I, the preceding data is maintained. For example, consider times t9 in FIG. 7 in which data has a high level at time t8. Namely, in this case, the conventional system operates so that the data turns into a low level at time t9, as shown by dotted line. In the present embodiment, however, the preceding data (or the high level) is held at time t9, as shown by solid line. In the output circuit including the CMOS circuit, a driving current flows at a data change point where the bit value of display data changes. Thereby, the power consumption is increased. However, in the present embodiment, an increase in power consumption is suppressed by causing no change in bit value so that a driving current does not flow.

Figure 6:
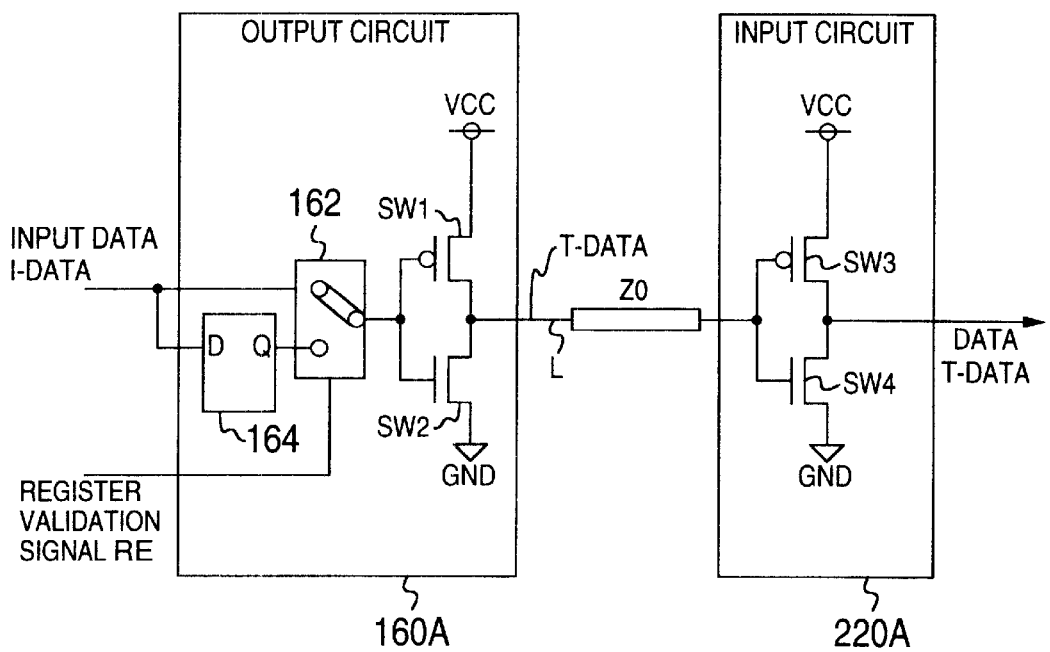
FIG. 6 is a circuit diagram showing the construction of an output circuit and an input circuit used in the data transmission circuit of the liquid crystal apparatus according to the embodiment of the present invention.

As shown in FIG. 6, the input circuit 220A is composed of switching circuits SW3 and SW4 which include, for example, CMOS. The switching circuits SW3 and SW4 are connected in series between a power supply voltage VCC and a ground potential GND, and the gate of the switching circuit SW3 has an inverted input.

When transmit data T-DATA inputted through the transmission line L has a low level, the switching circuit SW3 is turned on and the switching circuit SW4 is turned off, so that transmit data T-DATA outputted from the input circuit 220A takes a high level of the power supply voltage VCC. Also, when the transmit data T-DATA has a high level, the switching circuit SW3 is turned off and the switching circuit SW4 is turned on, so that the transmit data T-DATA outputted from the input circuit 220A takes a low level of the ground potential GND.

Figure 8:
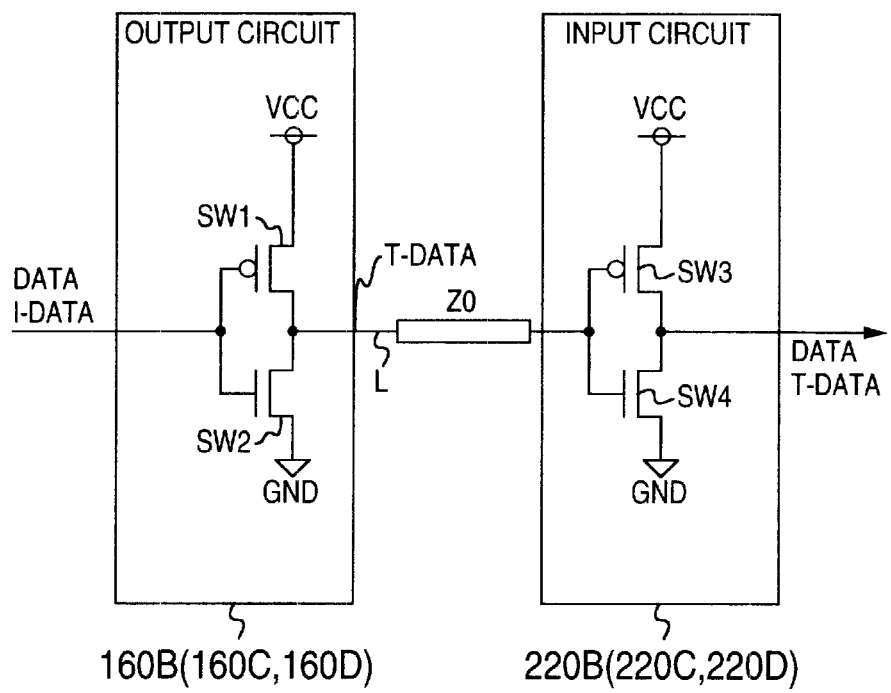
FIG. 8 is a circuit diagram showing the construction of an output circuit and an input circuit used in the data transmission circuit of the liquid crystal apparatus according to the embodiment of the present invention.

Next, the construction and operation of the output circuits 160B, 160C and 160D and the input circuits 220B, 220C and 220D used in the data transmission circuit of the liquid crystal apparatus according to the present embodiment will be described using FIG. 8.

The output circuit 160B, 160C or 160D is composed of switching circuits SW1 and SW2 which include, for example, CMOS. The switching circuits Scald SW2 are connected in series between a power supply voltage VCC and a ground potential GND, and the gate of the switching circuit SW1 has an inverted input.

When input data I-DATA has a low level, the switching circuit SW1 is turned on and the switching circuit SW2 is turned off, so that transmit data T-DATA outputted from the output circuit 160B, 160C or 160D to the transmission line L takes a high level of the power supply voltage VCC. Also, when the input data I-DATA has a high level, the switching circuit SW1 is turned off and the switching circuit SW2 is turned on, so that the transmit data T-DATA outputted from the output circuit 160B, 160C or 160D takes a low level of the ground potential GND.

The input circuit 220B, 220C or 220D is composed of switching circuits SW3 and SW4 of CMOS. The switching circuits SW3 and SW4 are connected in series between a power supply voltage VCC and a ground potential GND, and the gate of the switching circuit SW3 has an inverted input.

When transmit data T-DATA inputted through the transmission line L has a low level, the switching circuit SW3 is turned on and the switching circuit SW4 is turned off, so that transmit data T-DATA outputted from the input circuit 220B, 220C or 220D takes a high level of the power supply voltage VCC. Also, when the transmit data T-DATA has a high level, the switching circuit SW3 is turned off and the switching circuit SW4 is turned on, so that the transmit data T-DATA outputted from the input circuit 220B, 220C or 220D takes a low level of the ground potential GND.

As described above, in the case where the transmission of the same data held in the holding circuit 110 of the transceiver circuit 100 is to be made in transmitting 24-bit display data (for example, as shown at times t2, t3, t4, t9, - - -, t14 in FIGS. 4A to 4J), the preceding data is held as 21-bit data, as shown in FIG. 4I. Therefore, no change in bit value of display data of the output circuit is caused so that a driving current does not flow. Thereby, an increase in power consumption is suppressed. Information of data held in the holding circuit 110 is transmitted to the receiver circuit 200 by use of encoded 3-bit data. Therefore, the receiver circuit 200 can restore 24-bit display data by use of display data held in the holding circuit 210 of the receiver circuit 200. Namely, there results in that the transmission of 24-bit data can performed with 3 bits.

In the present embodiment, a 1-bit transmit signal is newly added as the register validation signal and hence there is a corresponding increase in power consumption. However, since a power consumption corresponding to 21 bits can be reduced, it is possible to attain a reduction in power consumption as a whole.

In a liquid crystal display apparatus using display data of 24 bits with 8 bits for each of R, G and B, in the case where a word processor or table calculation software as general application software for OA use is displayed on a liquid crystal panel, 256 color modes are involved but the number of colors actually used for display is about 10 to 20. In such display of application software for OA use, it has been ascertained that a hit rate exceeding 90% is obtained even in the case where the same display data as the preceding display data is transmitted and the holding circuit 210 is formed by a 3-stage shift register (that is, three kinds of display data are held). Namely, though the holding circuit 210 is formed by the 8-stage shift register in the example shown in FIG. 3, it is possible to attain a reduction in power consumption even if the number of stages of the shift register is reduced corresponding to display data.

Thus, in the case where each of the first and second output circuits 160A and 160B is a circuit (for example, CMOS circuit) for transmitting the n-bit parallel data in which data is represented by the voltage amplitude value of a power supply voltage VCC, the first output circuit 160A has a data holding circuit (for example, the latch circuit 164). In the case where the second result of judgement is outputted by the judgement unit (for example, the comparators CP0 to CP7, the OR circuit 130, the latch circuit 145, and so forth), (n−m)bit (for example, 21-bit) parallel data in the present n-bit (for example, 24-bit) parallel data inputted to the transmitter section 100 is transmitted from the first output circuit to the receiver section 200 through the transmission line while the present (n−m)-bit parallel data is stored into the data holding circuit. In the case where the first result of judgement is outputted by the judgement unit, that (n−m)-bit parallel data immediately before the output of the first result of judgement which is stored in the data holding circuit, is transmitted from the first output circuit to the receiver section through the transmission line.

With such a construction, in the case where the first result of judgement is outputted, the bit value of output data is not changed and hence a driving current does not flow, thereby enabling a reduction in power consumption as compared with the prior art.

As described above, the present embodiment enables a reduction in power consumption of the data transmission circuit and the liquid crystal display apparatus.

Next, the construction and operation of a liquid crystal display apparatus using a data transmission circuit according to a second embodiment of the present invention will be described using FIGS. 9 to 12.

The overall construction of the liquid crystal display apparatus in the second embodiment is similar to that of the apparatus shown in FIG. 1, the construction of a transceiver circuit 100 used in a data transmission circuit of the liquid crystal display apparatus is similar to that shown in FIG. 2, and the construction of a holding circuit 110 used in the transceiver 100 is similar to that shown in FIG. 3. Also, the construction of a receiver circuit 200 used in the data transmission circuit of the liquid crystal display apparatus according to the present embodiment is similar to that shown in FIG. 5.

In the present embodiment, the construction of an output circuit 160 and an input circuit 220 is particularly different. In connection with this, the present embodiment will now be described by use of FIGS. 9 to 12.

In the present embodiment, the output circuit uses, for example, an open drain circuit with a line terminated by a terminating resistor. A differential circuit is used as the input circuit.

Now, the construction of the output circuit 160A and the input circuit 220A used in the data transmission circuit of the liquid crystal display apparatus according to the present embodiment will be described using FIGS. 9 and 10.

The output circuit 160A is composed of a switching circuit SW1 of CMOS, an inverting circuit INV and a NOR circuit NOR. The drain of the switching circuit SW1 is connected to a termination voltage Vt through the impedance Z0 of a transmission line L and a terminating resistor Rt, and the source thereof is connected to a ground potential GND. The termination voltage Vt is lower than a power supply voltage VCC.

The input circuit 220A is composed of switching circuits SW3, SW4, SW5 and SW6 of CMOS, and a constant current source I. The switching circuits SW3 and SW4 are connected in series between the constant current source I and the ground potential GND, and the switching circuits SW5 and SW6 are connected in series between the constant current source I and the ground potential GND. An inverted input of the gate of the switching circuit SW3 is inputted with transmit display data T-DATA and an inverted input of the gate of the switching circuit SW5 is inputted with a reference voltage Vref so that a differential circuit is formed by the switching circuits SW3 and SW4 and the switching circuits SW5 and SW6.

When the gate input of the switching circuit SW3 has a low level, the switching circuit SW3 is turned off so that no current flows in the transmission line L. Thereby, the potential of the transmission line L becomes equal to the termination voltage Vt, as shown at time tm in FIG. 10. When the gate input of the switching circuit SW3 turns into a high level, the switching circuit SW3 is turned on so that a current flows in the transmission line L. Thereby, the potential of the transmission line L becomes lower than the termination voltage Vt by a voltage drop across the termination resistor Rt, as shown at time tm+1 in FIG. 10.

Figure 9:
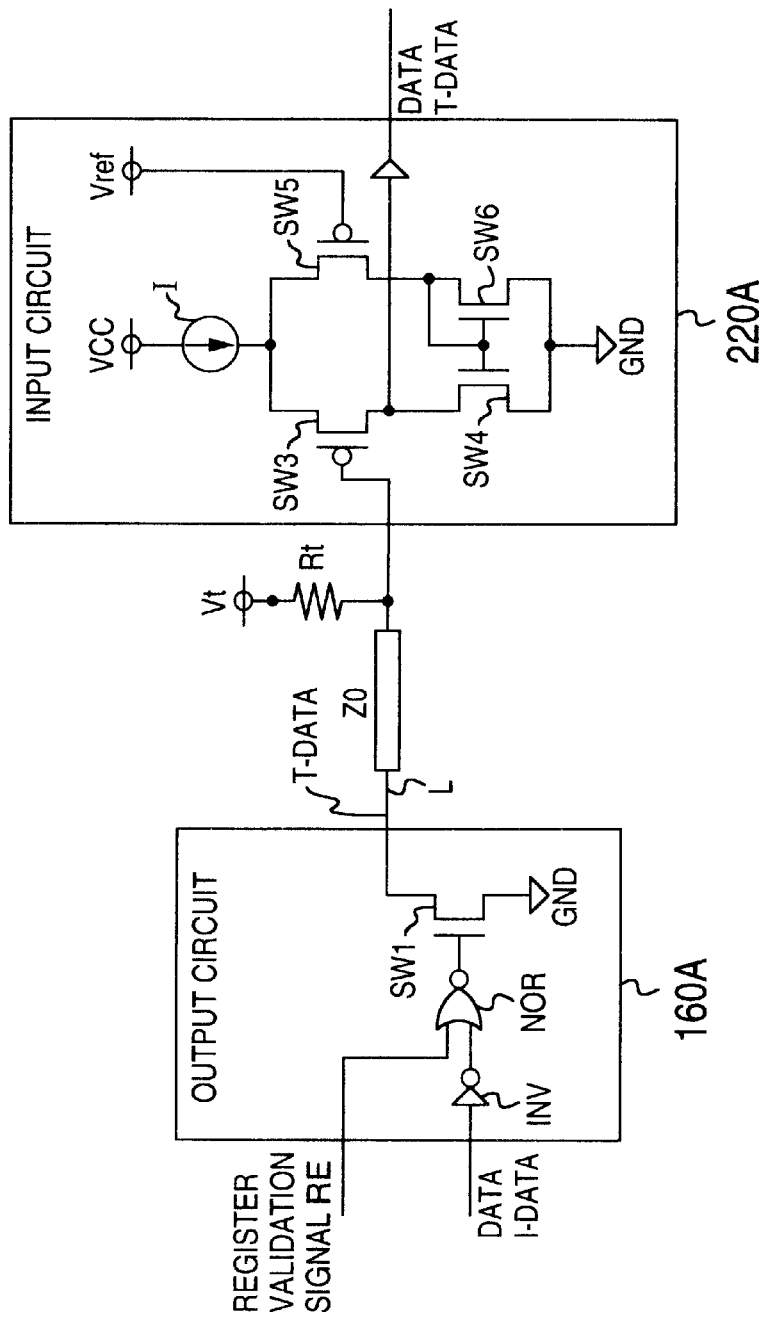
FIG. 9 is a circuit diagram showing the construction of an output circuit and an input circuit used in a data transmission circuit of a liquid crystal apparatus according to a second embodiment of the present invention.

Referring to FIG. 9, when a register validation signal RE has a low level, input display data I-DATA inputted to the inverting circuit INV is inputted to the gate of the switching circuit SW1 as it is, since the input display data I-DATA is inverted by the inverting circuit INV and is thereafter inverted by the NOR circuit NOR. On the other hand, when the register validation signal RE turns into a high level, the output of the NOR circuit NOR takes a low level always irrespective of the level of the input display data I-DATA.

Figure 10:
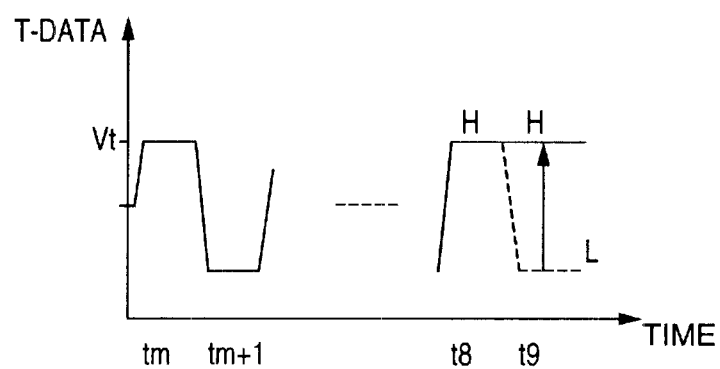
FIG. 10 is a diagram for explaining the operation of the output circuit and the input circuit used in the data transmission circuit of the liquid crystal apparatus according to the second embodiment of the present invention.

Now assume, for example, the case where transmit display data T-DATA has a high level H equal to the termination voltage Vt at time t8, as shown in FIG. 10 and that input display data I-DATA changes at time t9. In this case, the conventional system operates so that the transmit display data T-DATA turns into a low level L at time t9, as shown by dotted line. In the present embodiment, however, the register validation signal RE is turned into a high level at time t9 so that the transmit display data T-DATA maintains the high level H equal to the termination voltage Vt, as shown by solid line. When the switching circuit SW1 is placed in a turned-off condition, no driving current flows in the transmission line L. Thereby, it is possible to reduce the power consumption.

An example of display data transmitted in the present embodiment will now be described using FIGS. 11A to 11E.

FIG. 11A shows a transmission clock CLK, and FIG. 11B shows 24-bit input display data I-DATA inputted in synchronism with the transmission clock CLK. Namely, in synchronism with the timings t1, t2, t3, t4, t5, - - - of the transmission clock CLK, "Color 1", "Color 1", "Color 1", "Color 1", "Color 2", - - - are sequentially inputted as the input display data I-DATA to the holding circuit 110 shown in FIGS. 2 and 3.

At time t1, the register SR0 shown in FIG. 3 holds "Color 1", as shown by FIG. 11D, and the data RD0 shown in FIG. 2 provides "Color 1".

Next, when "Color 1" in the input display data is inputted to the holding circuit 110 at time t2, the comparator CP0 shown in FIG. 2 outputs a coincidence signal AG0 with a high level since the data RD0 and the input display data I-DATA coincide with each other. Accordingly, a selection signal SEL outputted by the OR circuit 130 takes a high level so that the selection circuits SL0 to SL7 shown in FIG. 3 select the outputs Q of the registers SR0 to SR7, respectively. As a result, the held contents of the register SR0 are maintained, as shown at time t2 in FIG. 4D. Also, when the selection signal SEL takes the high level, a register validation signal RE turns into a high level, as shown in FIG. 11C. Accordingly, the selection circuit 150 selects the output of the latch circuit 140. Herein, the output of the encoder 120 takes "000". Therefore, the output circuit 160B outputs "000". Since this encoded data indicates the register SR0, there results in that data indicating "Reg 0" is outputted from the output circuit 160B, as shown in FIG. 11E. Also, when the register validation signal RE takes the high level, the switching circuit SW1 of the output circuit 160A shown in FIG. 9 is turned off so that a high level H is outputted, as shown in FIG. 11D. The operations at times t3 and t4 are similar to that at time t2.

When "Color 2" is inputted as the input display data I-DATA to the holding circuit 110 at time t5, the output of the comparator CP0 shown in FIG. 2 turns into a low level. Therefore, the selection signal SEL outputted by the OR circuit 130 turns into a low level. Accordingly, the selection circuit SL0 shown in FIG. 3 selects the input data I-DATA and the selection circuit SL1 selects the output of the register SR0. As a result, the register SR0 holds "Color 2", as shown in FIG. 4D and the register SR1 holds "Color 1" shifted from the register SR0, as shown in FIG. 4E.

At times t6 to t8, the input display data I-DATA sequentially changes to "Color 3", "Color 4" and "Color 5", as shown in FIG. 11B. Therefore, the registers SR0, SR1, SR2, SR3 and SR4 sequentially operate as a shift register in a manner similar to that in the operation described in conjunction with time t5 so that they hold "Color 5", "Color 4", "Color 3", "Color 2" and "Color 1", respectively, at time t8.

Next, when "Color 2" in the input display data is inputted to the holding circuit 110 at time t9, "Color 2" is held in the register SR3 at time t9. Therefore, the comparator CP3 shown in FIG. 2 outputs a coincidence signal AG3 with a high level since both the data RD3 and the input display data I-DATA coincide as "Color 2". Accordingly, the selection signal SEL outputted by the OR circuit 130 turns into a high level so that the selection circuits SL0 to SL7 shown in FIG. 3 select the outputs Q of the registers SR0 to SR7, respectively. As a result, the held contents of the registers SR0 to SR4 at time 8 are maintained. Also, when the selection signal SEL takes the high level, the register validation signal RE turns into a high level, as shown in FIG. 11C. Accordingly, the selection circuit 150 selects the output of the latch circuit 140. Herein, the output of the encoder 120 takes "011". Therefore, the output circuit 160B outputs "011". Since this encoded data indicates the register SR3, there results in that data indicating "Reg 3" is outputted from the output circuit 160B, as shown in FIG. 11E. Also, when the register validation signal RE takes the high level, the switching circuit SW1 of the output circuit 160A is turned off so that a high level H is outputted, as shown in FIG. 11D.

Up to time t14, the same input display data I-DATA as that having already been held in the holding circuit 110 is inputted as "Color 3" at time t10, "Color 4" at time t11, - - - . Therefore, the operations at times t10 to t14 are similar to that at time t9. However, since the position of a register having the held data is different, 3-bit data indicating each register position is outputted, as shown in FIG. 11E.

Namely, as shown in FIGS. 11D and 11E, in the case where the input display data I-DATA is the same as data held in the holding circuit 110 (as shown at times t2, t3, t4, t9, t10, t11, t12, t13 and t14 in FIGS. 11A to 11E), the 21-bit data shown in FIG. 11D provides a high level output and the display data can be transmitted using the 3-bit data. Namely, the transmission of 24-bit display data is performed with 3 bits.

Figure 12:
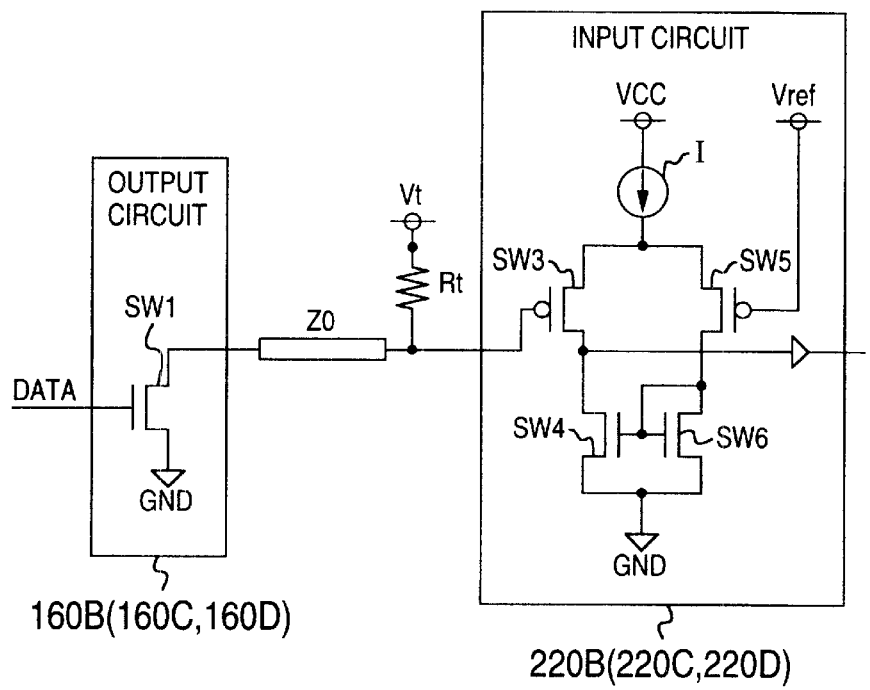
FIG. 12 is a circuit diagram showing the construction of an output circuit and an input circuit used in the data transmission circuit of the liquid crystal apparatus according to the second embodiment of the present invention.

Next, the construction and operation of the output circuits 160B, 160C and 160D and the input circuits 220B, 220C and 220D used in the data transmission circuit of the liquid crystal apparatus according to the present embodiment will be described using FIG. 12.

The output circuit 160B, 160C or 160D is composed of switching circuits SW1 and SW2 of CMOS. The drain of the switching circuit SW1 is connected to a termination voltage Vt through the impedance Z0 of a transmission line L and a terminating resistor Rt, and the source thereof is connected to a ground potential GND. The termination voltage Vt is lower than a power supply voltage VCC.

Also, the input circuit 220B, 220C or 220D is composed of switching circuits SW3, SW4, SW5 and SW6 of CMOS, and a constant current source I. The switching circuits SW3 and SW4 are connected in series between the constant current source I and the ground potential GND, and the switching circuits SW5 and SW6 are connected in series between the constant current source I and the ground potential GND. An inverted input of the gate of the switching circuit SW3 is inputted with transmit display data T-DATA and an inverted input of the gate of the switching circuit SW5 is inputted with a reference voltage Vref so that a differential circuit is formed by the switching circuits SW3 and SW4 and the switching circuits SW5 and SW6.

When the gate input of the switching circuit SW3 has a low level, the switching circuit SW3 is turned off so that no current flows in the transmission line L. Thereby, the potential of the transmission line L becomes equal to the termination voltage Vt. When the gate input of the switching circuit SW3 turns into a high level, the switching circuit SW3 is turned on so that a current flows in the transmission line L. Thereby, the potential of the transmission line L becomes lower than the termination voltage Vt by a voltage drop across the termination resistor Rt.

As described above, the present embodiment is constructed so that the open drain circuit is used as the output circuit, the line is terminated by the terminating resistor and the differential circuit is used as the input circuit. With such a construction, even in the case where the turn of input display data into a low level causes a driving current to flow in the transmission line so that there results in power consumption, it is possible to reduce the power consumption of the data transmission circuit and the liquid crystal display apparatus in such a manner that when the same display data as the preceding data is to be transmitted, 21-bit data is brought into a high level while encoded display data information is transmitted using 3 bits.

Namely, the transmission line is connected to the termination voltage through the terminating resistor. In the case where the second result of judgement is outputted by the judgement unit (the comparators CP0 to CP7, the OR circuit 130, the latch circuit 145, and so forth), the first and second output circuits 160A and 160B transmit an output with a low level and an output with a high level to the receiver section through the transmission line in accordance with (n–m)-bit (for example, 21-bit) parallel data of the present n-bit (for example, 24-bit) parallel data inputted to the transmitter section 100. In the case where the first result of judgement is outputted by the judgement unit, the first and second output circuits 160A and 160B transmit an output with a termination voltage level or an output with a high level to the receiver section through the transmission line.

In an example of the present invention, in the case where the first and second output circuits are open drain circuits, as in the above-described second embodiment, the above-mentioned output with a low level is a voltage level between a ground voltage and the termination voltage level and the above-mentioned output with a high level is the termination voltage level. In the case where the first result of judgement is outputted by the judgement unit, the output with a high level is transmitted to the receiver section through the transmission line. With such a construction, in the case where the first result of judgement is outputted, a steady current does not flow. Thereby, it is possible to reduce the power consumption as compared with the prior art.

In another example of the present invention, in the case where the first and second output circuits are push-pull circuits, as in a third embodiment which will be described later on, the above-mentioned output with a low level is a voltage level between the ground voltage and the termination voltage level and the above-mentioned output with a high level is a level between a power supply voltage of the first output unit and the termination voltage level. In the case where the first result of judgement is outputted by the judgement unit, the output with the termination voltage level is transmitted to the receiver section through the transmission line. With such a construction, in the case where the first result of judgement is outputted, a steady current does not flow. Thereby, it is possible to reduce the power consumption as compared with the prior art.

Next, the construction and operation of a liquid crystal display apparatus using a data transmission circuit according to a third embodiment of the present invention will be described using FIGS. 13 to 16.

The overall construction of the liquid crystal display apparatus in the third embodiment is similar to that of the apparatus shown in FIG. 1, the construction of a transceiver circuit 100 used in a data transmission circuit of the liquid crystal display apparatus is similar to that shown in FIG. 2, and the construction of a holding circuit 110 used in the transceiver 100 is similar to that shown in FIG. 3. Also, the construction of a receiver circuit 200 used in the data transmission circuit of the liquid crystal display apparatus according to the present embodiment is similar to that shown in FIG. 5.

In the present embodiment, the construction of an output circuit 160 and an input circuit 220 is particularly different. In connection with this, the present embodiment will now be described by use of FIGS. 13 to 16.

In the present embodiment, a push-pull circuit is used as the output circuit with a line terminated by a terminating resistor and a differential circuit is used as the input circuit, thereby enabling a high-speed operation.

Now, the construction of the output circuit 160A and the input circuit 220A used in the data transmission circuit of the liquid crystal display apparatus according to the present embodiment will be described using FIGS. 13 and 14.

The output circuit 160A is composed of switching circuits SW1 of CMOS, an inverting circuit INV, a NOR circuit NOR and an OR circuit OR. The switching circuits SW1 and SW2 are connected in series between a power supply voltage VCC and a ground potential. Input display data I-DATA is inputted to one input terminal of the NOR circuit NOR through the inverting circuit INV and to one input terminal of the OR circuit OR. A register validation signal RE is inputted to the other input terminal of the NOR circuit NOR and the other input terminal of the OR circuit OR. An output of the NOR circuit NOR is inputted to the gate of the switching circuit SW2, and an output of the OR circuit OR is inputted to the gate of the switching circuit SW1.

A transmission line L is connected to a termination voltage Vt through a terminating resistor Rt. The termination voltage Vt is lower than the power supply voltage VCC.

Also, the input circuit 220A is composed of switching circuits SW3, SW4, SW5 and SW6 of CMOS, and a constant current source I. The switching circuits SW3 and SW4 are connected in series between the power supply voltage VCC and the constant current source I, and the switching circuits SW5 and SW6 are connected in series between the power supply voltage VCC and the constant current source I. The gate of the switching circuit SW4 is inputted with transmit display data T-DATA and the gate of the switching circuit SW6 is inputted with the termination voltage Vt so that a differential circuit is formed by the switching circuits SW3 and SW4 and the switching circuits SW5 and SW6.

Figure 14:
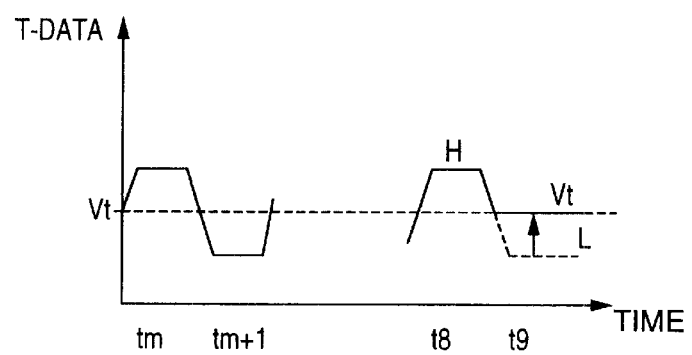
FIG. 14 is a diagram for explaining the operation of the output circuit and the input circuit used in the data transmission circuit of the liquid crystal apparatus according to the third embodiment of the present invention.

When the switching circuit SW1 is turned on and the switching circuit SW2 is turned off, a current flows from the power supply voltage VCC toward the termination voltage Vt through the transmission line L and the terminating resistor Rt so that the potential of the transmission line L becomes higher than the termination voltage Vt by a value corresponding to the termination resistor, as shown at time tm in FIG. 14. Also, when the switching circuit SW1 is turned off and the switching circuit SW2 is turned on, a current flows from the termination voltage Vt toward the ground potential GND through the terminating resistor Rt and the transmission line L so that the potential of the transmission line L becomes lower than the termination voltage Vt by a value corresponding to the termination resistor, as shown at time tm+1 in FIG. 14.

Further, in the present embodiment, the switching circuit SW1 and the switching circuit SW2 are both turned off. At this time, a current flows in the transmission line L so that the the potential of the transmission line L becomes equal to the termination voltage Vt.

Figure 13:
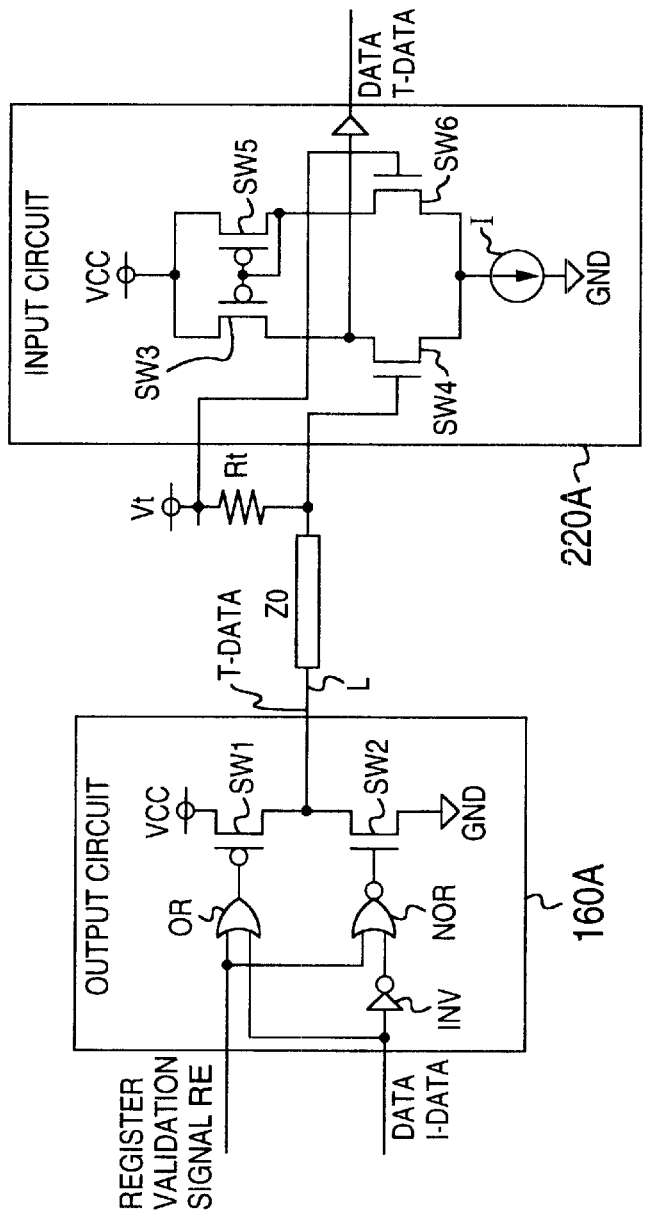
FIG. 13 is a circuit diagram showing the construction of an output circuit and an input circuit used in a data transmission circuit of a liquid crystal apparatus according to a third embodiment of the present invention.

Referring to FIG. 13, when a register validation signal RE has a low level, input display data I-DATA is inputted to the gate of the switching circuit SW2 through the inversion thereof by the inverting circuit INV and the subsequent inversion thereof by the NOR circuit NOR, that is, as it is while the input display data I-DATA is inputted to the switching circuit SW1 in an inverted form. On the other hand, when the register validation signal RE turns into a high level, the output of the NOR circuit NOR takes a low level always irrespective of the level of the input display data I-DATA and the output of the OR circuit OR takes a high level, so that the switching circuits SW1 and SW2 are both turned off.

Now assume, for example, the case where transmit display data T-DATA has a high level H higher than the termination voltage Vt at time t8, as shown in FIG. 14 and that input display data I-DATA changes at time t9. In this case, the conventional system operates so that the transmit display data T-DATA turns into a low level L at time t9, as shown by dotted line. In the present embodiment, however, the register validation signal RE is turned into a high level at time t9 so that the transmit display data T-DATA takes a voltage equal to the termination voltage Vt, as shown by solid line. When the switching circuits SW1 and SW2 are placed in a turned-off condition, no driving current flows in the transmission line L. Thereby, it is possible to reduce the power consumption.

An example of display data transmitted in the present embodiment will now be described using FIGS. 15A to 15E.

FIG. 15A shows a transmission clock CLK, and FIG. 15B shows 24-bit input display data I-DATA inputted in synchronism with the transmission clock CLK. Namely, in synchronism with the timings t1, t2, t3, t4, t5, - - - of the transmission clock CLK, "Color 1", "Color 1", "Color 1", "Color 1", "Color 2", - - - are sequentially inputted to the holding circuit 110 shown in FIGS. 2 and 3.

At time t1, the register SR0 shown in FIG. 3 holds "Color 1", as shown by FIG. 15D, and the data RD0 shown in FIG. 2 provides "Color 1".

Next, when "Color 1" in the input display data is inputted to the holding circuit 110 at time t2, the comparator CP0 shown in FIG. 2 outputs a coincidence signal AG0 with a high level since the data RD0 and the input display data I-DATA coincide with each other. Accordingly, a selection signal SEL outputted by the OR circuit 130 takes a high level so that the selection circuits SL0 to SL7 shown in FIG. 3 select the outputs Q of the registers SR0 to SR7, respectively. As a result, the held contents of the register SR0 are maintained, as shown at time t2 in FIG. 4D. Also, when the selection signal SE1 takes the high level, a register validation signal RE turns into a high level, as shown in FIG. 15C. Accordingly, the selection circuit 150 selects the output of the latch circuit 140. Herein, the output of the encoder 120 takes "000". Therefore, the output circuit 160B outputs "000". Since this encoded data indicates the register SR0, there results in that data indicating "Reg 0" is outputted from the output circuit 160B, as shown in FIG. 15E. Also, when the register validation signal RE takes the high level, the switching circuits SW1 and SW2 of the output circuit 160A shown in FIG. 13 are turned off so that the potential of the transmission line L takes the termination voltage Vt, as shown in FIG. 15D. The operations at times t3 and t4 are similar to that at time t2.

When "Color 2" is inputted as the input display data I-DATA to the holding circuit 110 at time t5, the output of the comparator CP0 shown in FIG. 2 turns into a low level. Therefore, the selection signal SEL outputted by the OR circuit 130 turns into a low level. Accordingly, the selection circuit SL0 shown in FIG. 3 selects the input data I-DATA and the selection circuit SL1 selects the output of the register SR0. As a result, the register SR0 holds "Color 2", as shown in FIG. 4D and the register SR1 holds "Color 1" shifted from the register SR0, as shown in FIG. 4E.

At times t6 to t8, the input display data I-DATA sequentially changes to "Color 3", "Color 4" and "Color 5", as shown in FIG. 15B. Therefore, the registers SR0, SR1, SR2, SR3 and SR4 sequentially operate as a shift register in a manner similar to that in the operation described in conjunction with time t5 so that they hold "Color 5", "Color 4", "Color 3", "Color 2" and "Color 1", respectively, at time t8.

Next, when "Color 2" in the input display data is inputted to the holding circuit 110 at time t9, "Color 2" is held in the register SR3 at time t9. Therefore, the comparator CP3 shown in FIG. 2 outputs a coincidence signal AG3 with a high level since both the data RD3 and the input display data I-DATA coincide as "Color 2". Accordingly, the selection signal SEL outputted by the OR circuit 130 turns into a high level so that the selection circuits SL0 to SL7 shown in FIG. 3 select the outputs Q of the registers SR0 to SR7, respectively. As a result, the held contents of the registers SR0 to SR4 at time 8 are maintained. Also, when the selection signal SEL takes the high level, the register validation signal RE turns into a high level, as shown in FIG. 15C. Accordingly, the selection circuit 150 selects the output of the latch circuit 140. Herein, the output of the encoder 120 takes "011". Therefore, the output circuit 160B outputs "011". Since this encoded data indicates the register SR3, there results in that data indicating "Reg 3" is outputted from the output circuit 160B, as shown in FIG. 15E. Also, when the register validation signal RE takes the high level, the switching circuits SW1 and SW2 of the output circuit 160A shown in FIG. 13 are turned off so that the potential of the transmission line L takes the termination voltage Vt, as shown in FIG. 15D.

Up to time t14, the same input display data I-DATA as that having been held in the holding circuit 110 is inputted as "Color 3" at time t10, "Color 4" at time t11, - - - . Therefore, the operations at times t10 to t14 are similar to that at time t9. However, since the position of a register having the held data is different, 3-bit data indicating each register position is outputted, as shown in FIG. 15E.

Namely, as shown in FIGS. 15D and 15E, in the case where the input display data I-DATA is the same as data held in the holding circuit 110 (as shown at times t2, t3, t4, t9, t10, t11, t12, t13 and t14 in FIGS. 15A to 15E), the 21-bit data shown in FIG. 15D provides an output having the termination voltage Vt and the display data can be transmitted using the 3-bit data. Namely, the transmission of 24-bit display data is performed with 3 bits.

Figure 16:
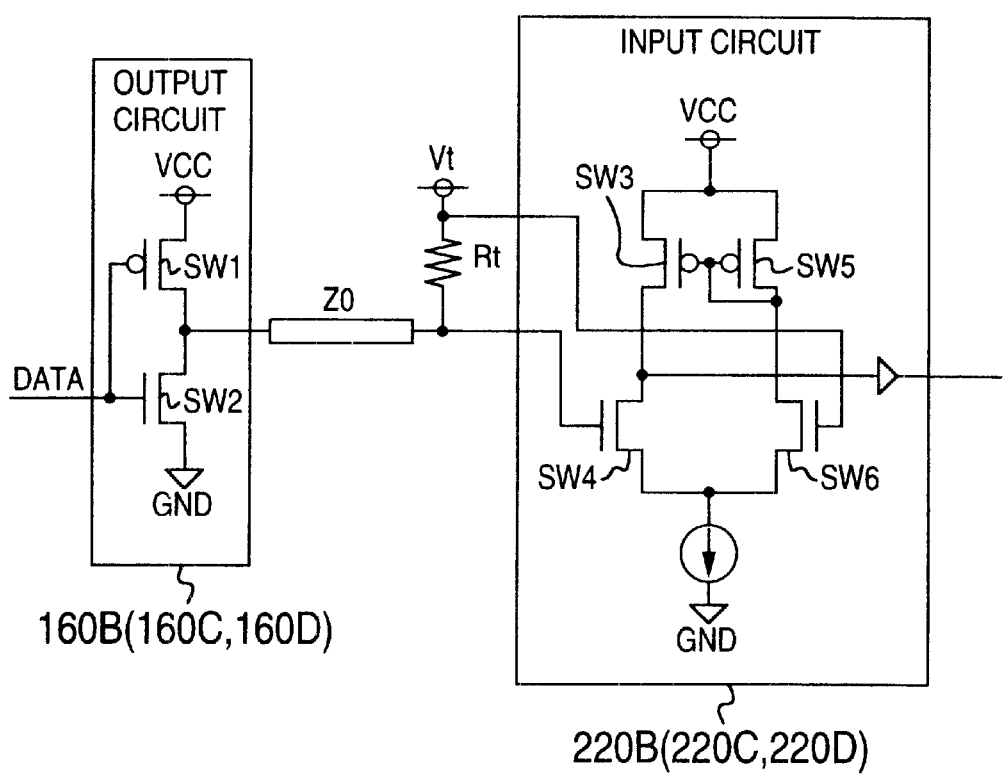
FIG. 16 is a circuit diagram showing the construction of an output circuit and an input circuit used in the data transmission circuit of the liquid crystal apparatus according to the third embodiment of the present invention.

Next, the construction and operation of the output circuits 160B, 160C and 160D and the input circuits 220B, 220C and 220D used in the data transmission circuit of the liquid crystal apparatus according to the present embodiment will be described using FIG. 16.

The output circuit 160B, 160C or 160D is composed of switching circuits SW1 and SW2 of CMOS. The switching circuits SW1 and SW2 are connected in series between a power supply voltage VCC and a ground potential GND. Input display data I-DATA is inputted to the gate of the switching circuit SW2 and an inverted input of the gate of the switching circuit SW1.

A transmission line L is connected to a termination voltage Vt through a terminating resistor Rt. The termination voltage Vt is lower than the power supply voltage VCC.

Also, the input circuit 220B, 220C or 220D is composed of switching circuits SW3, SW4, SW5 and SW6 of CMOS, and a constant current source I. The switching circuits SW3 and SW4 are connected in series between and the power supply voltage VCC and the constant current source I, and the switching circuits SW5 and SW6 are connected in series between the power supply voltage VCC and the constant current source I. The gate of the switching circuit SW4 is inputted with transmit display data T-DATA and the gate of the switching circuit SW6 is inputted with the termination voltage Vt so that a differential circuit is formed by the switching circuits SW3 and SW4 and the switching circuits SW5 and SW6.

When the switching circuit SW1 is turned on and the switching circuit SW2 is turned off, a current flows from the power supply voltage VCC toward the termination voltage Vt through the transmission line L and the terminating resistor Rt so that the potential of the transmission line L becomes higher than the termination voltage Vt by a value corresponding to the termination resistor. Also, when the switching circuit SW1 is turned off and the switching circuit SW2 is turned on, a current flows from the termination voltage Vt toward the ground potential GND through the terminating resistor Rt and the transmission line L so that the potential of the transmission line L becomes lower than the termination voltage Vt by a value corresponding to the termination resistor.

As described above, the present embodiment is constructed so that the push-pull circuit is used as the output circuit, the line is terminated by the terminating resistor and the differential circuit is used as the input circuit. With such a construction, even in the case where the turn of input display data into a high level or a low level causes a driving current to flow in the transmission line so that there results in power consumption, it is possible to reduce the power consumption of the data transmission circuit and the liquid crystal display apparatus in such a manner that when the same display data as the preceding data is to be transmitted, 21-bit data is brought into the termination voltage level while encoded display data information is transmitted using 3 bits.

Though each of the foregoing embodiments has been described in conjunction with the case where the number of stages of the shift register of the holding circuit 110 or 210 is eight, the number of stages is not limited to this value or can be set so that the power consumption becomes the minimum.

In the foregoing embodiments, n and m are respectively set to 24 and 3 for the holding circuit 110 storing, n-bit parallel data inputted to the transmitter section, by a plurality of sets thereof the number of which is $2^m$ or less than that (m: integer satisfying m<n). When m is set to be a larger number, there is increased a possibility that the present n-bit parallel data inputted to the transmitter section coincides with any one of the plural sets of n-bit parallel data. However, there is also increased that m-bit information transmitted at the time of coincidence which indicates a hold position in the holding circuit 210. This is not preferable from the aspect of reduction in power consumption. In the present invention, therefore, m is set to a proper value from the aspect of the possibility of coincidence and the reduction in power consumption.

In each of the foregoing embodiments, the first and second holding circuits 110 and 210 are made the same in construction so that when the present n-bit parallel data inputted to the transmitter section coincides with one of the plural sets of n-bit parallel data stored in the first holding 110, information indicating a hold position of that n-bit parallel data in the first holding circuit 110 is used as information indicating a hold position of the same n-bit parallel data in the second holding circuit 210. However, there may be used a construction in which a data hold position in the first holding circuit 110 and a data hold position in the second holding circuit 210 are set such that they have a predetermined relationship and this relationship is, for example, stored in a memory such as a table or map at the receiver section 200. With this construction, if information indicating a hold position in the first holding circuit 110 is transmitted to the receiver section 200, it is possible to know the corresponding hold position in the second holding circuit 210 by use of the memory. Such a memory may be provided in the transmitter section 100. In this case, information indicating a hold position in the first holding circuit 110 is converted into information indicating the corresponding hold position in the second holding circuit 210 at the transmitter section and is thereafter transmitted to the receiver section.

Though each of the foregoing embodiments has been described in conjunction with the transmission of data between the liquid crystal controller and the data driver, the present invention is not limited thereto. The present invention is applicable to a transceiver circuit or a receiver circuit which serially transmits display data or the like.

According to the present invention as described above, it is possible to reduce the power consumption of the data transmission circuit and the liquid crystal display apparatus.

What is claimed is:

1. A data transmission circuit having a transmitter section sequentially inputted with n-bit parallel data, n being an integer, and a receiver section connected to the transmitter section through a transmission line, in which the n-bit parallel data is transmitted from said transmitter section to said receiver section through said transmission line, wherein said transmitter section is provided with:

a first holding circuit to store the n-bit parallel data inputted to the transmitter section, by plural sets the number of which is not more than $2^m$, where m is an integer satisfying m<n;

a determination circuit to output a first result of determination in a case where a present n-bit parallel data inputted to said transmitter section is determined to be identical to one set of said plural sets of n-bit parallel data stored in said first holding circuit, and to output a second result of determination in a case where the present n-bit parallel data inputted to said transmitter section is determined to be identical to none of said plural sets of n-bit parallel data;

a hold position information output circuit to output hold position information with m or less bits indicative of a hold position of the one set of n-bit parallel data in a second holding circuit in the case where said first result of determination is outputted by said determination circuit;

a first output circuit to transmit said hold position information to said receiver section through said transmission line in the case where said first result of determination is outputted by said determination circuit, while transmitting said present n-bit parallel data inputted to said transmitter section to said receiver section through said transmission line in the case where said second result of determination is outputted by said determination circuit; and said first holding circuit being controlled to store said present n-bit parallel data inputted to said transmitter section, in the case where said second result of determination is outputted by said determination circuit; and wherein said receiver section is provided with:

said second holding circuit to store the same plural sets of n-bit parallel data as said first holding circuit; and a second output circuit to read, in the case where said holding position information is received through said transmission line, said one set of n-bit parallel data from said second holding circuit in accordance with said hold position information and outputting the read data from said receiver section, while storing, in the case where said present n-bit parallel data is received through said transmission line, the received present n-bit parallel data into said second holding circuit and outputting the data from said receiver section.

2. A data transmission circuit according to claim 1, wherein said first output circuit of said transmitter section transmits, in the case where said first result of determination is outputted by said determination circuit, said hold position information together with a signal indicative of said first result of determination to said receiver section through said transmission line, and transmits, in the case where said second result of determination is outputted, said present n-bit parallel data inputted to said transmitter section together with a signal indicative of said second result of determination to said receiver section through said transmission line; and wherein said second output circuit of said receiver section reads, in the case where said signal indicative of said first result of determination is received through said transmission line, said one set of n-bit parallel data from said second holding circuit in accordance with said hold position information while outputting the read data from said receiver section, and stores, in the case where said signal indicative of said second result of determination is received through said transmission line, the received present n-bit parallel data into said second holding circuit in response to said signal indicative of said second result of determination while outputting the data from said receiver section.

3. A data transmission circuit according to claim 1, wherein said first output circuit of said transmitter section includes a first output transmit circuit by which in the case where said second result of determination is outputted by said determination circuit, (n−m)-bit parallel data of said present n-bit parallel data inputted in said transmitter section is transmitted to said receiver section through said transmission line and a second output transmit circuit by which in the case where said second result of determination is outputted by said determination circuit, the remaining m-bit parallel data of said present n-bit parallel data inputted to said transmitter section is transmitted to said receiver section through said transmission line, said second output transmit circuit transmitting said hold position information to said receiver section through said transmission line in the case where said first result of determination is outputted by said determination circuit.

4. A data transmission circuit according to claim 1, wherein each of said first and second holding circuits is formed by a plural-stage shift register the respective stages of which store said plural sets of n-bit parallel data, and said hold position information output circuit outputs information with m or less bits indicative of a hold position of said one set of n-bit parallel data in said first holding circuit as said hold position information indicative of the hold position of said one set of n-bit parallel data in said second holding circuit.

5. A data transmission circuit according to claim 3, wherein each of said first and second output transmit circuits is a circuit to transmit the n-bit parallel data in which data is represented by the voltage amplitude value of a power supply voltage, and said first output transmit circuit has a data holding circuit;

wherein in the case where said second result of determination is outputted by said determination circuit, (n−m)-bit parallel data in said present n-bit parallel data inputted to said transmitter section is transmitted from said first output transmit circuit to said receiver section through the transmission line while the present (n−m)-bit parallel data is stored into the data holding circuit, and wherein in the case where said first result of determination is outputted by said determination circuit, that (n−m)-bit parallel data immediately before the output of said first result of determination which is stored in the data holding circuit, is transmitted from said first output transmit circuit to said receiver section through said transmission line.

6. A data transmission circuit according to claim 5, wherein each of said first and second output transmit circuits is formed by a CMOS circuit.

7. A data transmission circuit according to claim 3, wherein said transmission line is connected to a termination voltage through a terminating resistor, and wherein said first and second output transmit circuits transmit, in the case where said second result of determination is outputted by said determination circuit, an output with a low level and an output with a high level to said receiver section through said transmission line in accordance with the (n−m)-bit parallel data of the present n-bit parallel data inputted to said transmitter section, and transmit, in the case where said first result of determination is outputted by said determination circuit, an output with a level of said termination voltage or an output with a high level to said receiver section through said transmission line.

8. A data transmission circuit according to claim 7, wherein said first and second output transmit circuits are open drain circuits, and said output with a low level is a voltage level between a ground voltage and said termination voltage level, and said output with a high level is said termination voltage level, and wherein in the case where said first result of determination is outputted by said determination circuit, said output with a high level is transmitted to said receiver section through said transmission line.

9. A data transmission circuit according to claim 7, wherein said first and second output transmit circuits are push-pull circuits, said output with a low level is a voltage level between a ground voltage and said termination voltage level, and said output with a high level is a level between a power supply voltage of said first output circuit and said termination voltage level, and wherein in the case where said first result of determination is outputted by said determination circuit, said output with the termination voltage level is transmitted to said receiver section through said transmission line.

10. A data transmission method in a data transmission circuit having a transmitter section sequentially inputted with n-bit parallel data, n being an integer, and a receiver section connected to the transmitter section through a transmission line, in which the n-bit parallel data is transmitted from said transmitter section to said receiver section through said transmission line, said transmitter section includes a first holding circuit to store the n-bit parallel data inputted to said transmitter section, by plural sets the number of which is not more than $2^m$, where m is an integer satisfying m<n, and said receiver section includes a second holding circuit to store the same plural sets of n-bit parallel data as said first holding circuit, the method comprising:

determining whether or not a present n-bit parallel data inputted to said transmitter section is identical to any one of said plural sets of n-bit parallel data stored in said first holding circuit, and indicating a first result of determination in a case where the present n-bit parallel data is found to be identical to one set of said plural sets, and indicating a second result of determination in a case where the present n-bit parallel data is found to be identical to none of said plural sets;

acquiring hold position information with m or less bits indicative of a hold position of the one set of n-bit parallel data in a second holding circuit in the case where said first result of determination is obtained;

transmitting said hold position information to said receiver section through said transmission line in the case where said first result of determination is obtained, while transmitting said present n-bit parallel data inputted to said transmitter section to said receiver section through said transmission line in the case where said second result of determination is obtained;

inputting and storing, in the case where said second result of determination is obtained, said present n-bit parallel data inputted to said transmitter section; and reading, in the case where said receiver section receives said hold position information through said transmission line, said one set of n-bit parallel data from said second holding circuit in accordance with said hold position information and outputting the read data from said receiver section, while storing, in the case where said receiver section receives said present n-bit parallel data through said transmission line, the received present n-bit parallel data into said second holding circuit and outputting the data from said receiver section.

11. A liquid crystal display apparatus having a liquid crystal controller including a transmitter section sequentially inputted with n-bit parallel display data, n being an integer, a data driver including a receiver section to receive the display data transmitted through said liquid crystal controller and a transmission line, and a liquid crystal panel to display the display data received by said data driver, where said transmitter section comprises:

a first holding circuit to store the n-bit parallel display data inputted to said transmitter section, by plural sets the number of which is not more than $2^m$, where m is an integer satisfying m<n;

a determination circuit to determine whether or not a present n-bit parallel display data inputted to said transmitter section is identical to any one of said plural sets of n-bit parallel display data stored in said first holding circuit, and to indicate a first result of determination in a case where the present n-bit parallel display data is identical to one set of said plural sets, and to indicate a second result of determination in a case where the present n-bit parallel display data is identical to none of said plural sets;

a hold position information output circuit to output hold position information with m or less bits indicative of a hold position of the one set of n-bit parallel display data in a second holding circuit in the case where said first result of determination is outputted by said determination circuit;

a first output circuit to transmit said hold position information to said receiver section through said transmission line in the case where said first result of determination is outputted by said determination circuit, while transmitting said present n-bit parallel display data inputted to said transmitter section to said receiver section through said transmission line in the case where said second result of determination is outputted by said determination circuit; and said first holding circuit being controlled to store said present n-bit parallel display data inputted to said transmitter section, in the case where said second result of determination is outputted by said determination circuit; and wherein said receiver section comprises:

said second holding circuit to store the same plural sets of n-bit parallel display data as said first holding circuit; and a second output circuit to read, in the case where said hold position information is received through said transmission line, said one set of n-bit parallel display data from said second holding circuit in accordance with said hold position information and outputting the read display data from said receiver section, while storing, in the case where said present n-bit parallel display data is received through said transmission line, the received present n-bit parallel display data into said second holding circuit and outputting the display data from said receiver section.

12. A liquid crystal display apparatus according to claim 11, wherein said first output circuit of said transmitter section transmits, in the case where said first result of determination is outputted by said determination circuit, said hold position information together with a signal indicative of said first result of determination to said receiver section through said transmission line, and transmits, in the case where said second result of determination is outputted, said present n-bit parallel display data inputted to said transmitter section together with a signal indicative of said second result of determination to said receiver section through said transmission line, and wherein said second output circuit of said receiver section reads, in the case where said signal indicative of said first result of determination is received through said transmission line, said one set of n-bit parallel display data from said second holding circuit in accordance with said hold position information while outputting read display data from said receiver section, and stores, in the case where said signal indicative of said second result of determination is received through said transmission line, the received present n-bit parallel display data into said second holding circuit in response to said signal indicative of said second result of determination while outputting the display data from said receiver section.

13. A liquid crystal display apparatus according to claim 11, wherein said first output circuit of said transmitter section includes a first output transmit circuit by which in the case where said second result of determination is outputted by said determination circuit, (n–m)-bit parallel display data of said present n-bit parallel display data inputted to said transmitter section is transmitted to said receiver section through said transmission line, and a second output transmit circuit by which in the case where said second result of determination is outputted by said determination circuit, the remaining m-bit parallel display data of said present n-bit parallel display data inputted to said transmitter section is transmitted to said receiver section through said transmission line, said second output transmit circuit transmitting said hold position information to said receiver section through said transmission line in the case where said first result of determination is outputted by said determination circuit.

14. A liquid crystal display apparatus according to claim 11, wherein each of said first and second holding circuits is formed by a plural-stage shift register the respective stages of which store said plural sets of n-bit parallel display data, and said hold position information output circuit outputs information with m or less bits indicative of a hold position of said one set of n-bit parallel display data in said first holding circuit as said information indicative of the hold position of said one set of n-bit parallel display data in said second holding circuit.

15. A liquid crystal display apparatus according to claim 13, wherein each of said first and second output transmit circuits is a circuit to transmit the n-bit parallel display data in which display data is represented by the voltage amplitude value of a power supply voltage, and said first output transmit circuit has a data holding circuit, wherein in the case where said second result of determination is outputted by said determination circuit, (n–m)-bit parallel display data in said present n-bit parallel display data inputted to said transmitter section is transmitted from said first output transmit circuit to said receiver section through the transmission line while the present (n–m)-bit parallel display data is stored into the data holding circuit, and wherein in the case where said first result of determination is outputted by said determination circuit, that (n–m)-bit parallel display data immediately before the output of said first result of determination which is stored in the data holding circuit, is transmitted from said first output transmit circuit to said receiver section through said transmission line.

16. A liquid crystal display apparatus according to claim 15, wherein each of said first and second output transmit circuits is formed by a CMOS circuit.

17. A liquid crystal display apparatus according to claim 13, wherein said transmission line is connected to a termination voltage through a terminating resistor, and wherein said first and second output transmit circuits transmit, in the case where said second result of determination is outputted by said determination circuit, an output with a low level and an output with a high level to said receiver section through said transmission line in accordance with the (n–m)-bit parallel display data of said present n-bit parallel display data inputted to said transmitter section, and transmit, in the case where said first result of determination is outputted by said determination circuit, an output with a level of said termination voltage or an output with a high level to said receiver section through said transmission line.

18. A liquid crystal display apparatus according to claim 17, wherein said first and second output transmit circuits are open drain circuits, said output with a low level is a voltage level between a ground voltage and said termination voltage level, and said output with a high level is said termination voltage level, and wherein in the case where said first result of determination is outputted by said determination circuit, said output with a high level is transmitted to said receiver section through said transmission line.

19. A liquid crystal display apparatus according to claim 17, wherein said first and second output transmit circuits are push-pull circuits, said output with a low level is a voltage level between a ground voltage and said termination voltage level, and said output with a high level is a level between a power supply voltage of said first output circuit and said termination voltage level, and wherein in the case where said first result of determination is outputted by said determination circuit, said output with the termination voltage level is transmitted to said receiver section through said transmission line.

* * * * *